(12) United States Patent
Gewickey et al.

(10) Patent No.: US 12,203,769 B2
(45) Date of Patent: Jan. 21, 2025

(54) REAL-TIME ROUTE CONFIGURING OF ENTERTAINMENT CONTENT

(71) Applicant: WARNER BROS. ENTERTAINMENT INC., Burbank, CA (US)

(72) Inventors: Gregory I. Gewickey, Simi Valley, CA (US); Michael Zink, Escondido, CA (US); Ha Nguyen, Fullerton, CA (US); Pamela J. Allison, Burbank, CA (US); Rana Brahma, Burbank, CA (US); Prashant Abhyankar, Burbank, CA (US); Genevieve Morris, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 576 days.

(21) Appl. No.: 17/417,106

(22) PCT Filed: Dec. 18, 2019

(86) PCT No.: PCT/US2019/067284
§ 371 (c)(1),
(2) Date: Jun. 21, 2021

(87) PCT Pub. No.: WO2020/132141
PCT Pub. Date: Jun. 25, 2020

(65) Prior Publication Data
US 2022/0074756 A1 Mar. 10, 2022

Related U.S. Application Data

(60) Provisional application No. 62/782,306, filed on Dec. 19, 2018.

(51) Int. Cl.
*G06Q 30/0251* (2023.01)
*G01C 21/34* (2006.01)
(Continued)

(52) U.S. Cl.
CPC ..... *G01C 21/3641* (2013.01); *G01C 21/3415* (2013.01); *G01C 21/3644* (2013.01); *G06Q 30/0251* (2013.01); *G06Q 50/14* (2013.01)

(58) Field of Classification Search
CPC .. G06F 16/787; G06Q 50/14; G06Q 30/0251; G01C 21/3641; G01C 21/3415; G01C 21/3644
See application file for complete search history.

(56) References Cited

U.S. PATENT DOCUMENTS 9,026,555 B2 5/2015 Shahraray et al.
10,242,457 B1 * 3/2019 Sibley ...................... G06F 3/14
(Continued)

FOREIGN PATENT DOCUMENTS

JP 4870784 B2 * 2/2012 ............. G01C 21/26
KR 10-2015-0131934 A 11/2015

OTHER PUBLICATIONS

EPO, Supplemental European Search Report, Aug. 29, 2022.
WO, PCT/US2019/067284 ISR and Written Opinion, Apr. 22, 2020.

*Primary Examiner* — Tarek Chbouki
(74) *Attorney, Agent, or Firm* — Bookoff McAndrews, PLLC

(57) ABSTRACT

A computer-implemented method for producing real-time media content customized for a travel event in a dynamic travel route between an origin and a destination of a connected vehicle. The method includes maintaining media production data, receiving information on a travel event including route information, producing media content based on the travel event and travel route information, and streaming the media content to connected cars and servers along the travel route.

22 Claims, 15 Drawing Sheets

(51) Int. Cl.
*G01C 21/36* (2006.01)
*G06Q 50/14* (2012.01)

(56) References Cited

U.S. PATENT DOCUMENTS

| | | | | |
|---|---|---|---|---|
| 11,200,650 | B1* | 12/2021 | Ben Zadok | G06N 3/04 |
| 2004/0098175 | A1* | 5/2004 | Said | G01C 21/3632 |
| | | | | 701/1 |
| 2010/0023544 | A1 | 1/2010 | Shahraray et al. | |
| 2013/0142019 | A1* | 6/2013 | Itou | G11B 27/031 |
| | | | | 369/7 |
| 2014/0101123 | A1 | 4/2014 | Ganesh | |
| 2014/0281971 | A1* | 9/2014 | Isbell, III | H04N 21/458 |
| | | | | 715/716 |
| 2015/0006541 | A1* | 1/2015 | Hampiholi | G06F 16/4387 |
| | | | | 707/741 |
| 2015/0006617 | A1 | 1/2015 | Yoo et al. | |
| 2015/0063781 | A1* | 3/2015 | Silverman | H04N 21/41265 |
| | | | | 386/241 |
| 2016/0188182 | A1 | 6/2016 | Burkard et al. | |
| 2018/0046784 | A1* | 2/2018 | Flores | G06F 16/783 |
| 2018/0188054 | A1* | 7/2018 | Kennedy | G01C 21/3697 |
| 2018/0211337 | A1* | 7/2018 | Ghaddar | G06Q 50/14 |
| 2019/0324600 | A1* | 10/2019 | Wipperfürth | H04W 4/48 |
| 2020/0084519 | A1* | 3/2020 | Pappu | H04N 21/8405 |
| 2020/0250798 | A1* | 8/2020 | Lasang | G06T 5/006 |

\* cited by examiner

```
┌─────────────────────────────────────┐
│  MAINTAIN DATA STRUCTURE OF MEDIA   │  ─ 1102
│         PRODUCTION DATA             │
└─────────────────────────────────────┘
                  │
                  ▼
┌─────────────────────────────────────┐
│ DETERMINE ASSOCIATIONS OF MEDIA     │  ─ 1104
│ COMPONENTS WITH PARAMETERS OF A     │
│         MEDIA SEGMENT               │
└─────────────────────────────────────┘
                  │
                  ▼
┌─────────────────────────────────────┐
│ RECEIVE INFORMATION ABOUT A TRAVEL  │  ─ 1106
│ EVENT, INCLUDING ROUTE INFORMATION  │
└─────────────────────────────────────┘
                  │
                  ▼
┌─────────────────────────────────────┐
│ ASSEMBLE/PRODUCE MEDIA CONTENT      │  ─ 1108
│ BASED ON TRAVEL EVENT AND ROUTE     │
│             INFORMATION             │
└─────────────────────────────────────┘
                  │
                  ▼
┌─────────────────────────────────────┐
│        DELIVER MEDIA CONTENT        │  ─ 1110
└─────────────────────────────────────┘
                  │
                  ▼
┌─────────────────────────────────────┐
│    RECEIVE AND OUTPUT MEDIA CONTENT │  ─ 1112
└─────────────────────────────────────┘
```

1122 — SELECTING OR CONFIGURING THE MEDIA COMPONENTS BASED ON THE ESTIMATED DURATION OF THE TRIP, TO COMPLETE A DEFINED NARRATIVE WITHIN A TARGETED PORTION THEREOF

1124 — SELECTING THE DEFINED NARRATIVE BASED ON AN IDENTITY OF A LAST COMPLETE ONE OF THE SEQUENCE OF RELATED NARRATIVES PRESENTED TO THE PASSENGER

1126 — SELECTING OR CONFIGURING THE DEFINED NARRATIVE TO ENABLE COMPLETION WITHIN THE TARGETED PORTION OF THE TRIP DURATION

1128 — SELECTING OR CONFIGURING FURTHER BASED ON USER PREFERENCE INFORMATION FOR ONE OR MORE PASSENGERS IN A VEHICLE

1130 — AT LEAST ONE OF SELECTING OR CONFIGURING INCLUDES A PREDICTIVE ALGORITHM THAT PREDICTS AN AFFINITY OF A USER OF THE PLAYER DEVICE BASED AT LEAST IN PART ON USER PROFILE DATA AND THE TRIP EVENT INFORMATION

1142
SELECTING OR CONFIGURING THE MEDIA COMPONENTS BASED ON AT LEAST ONE PLACE SELECTED FROM THE TRIP ORIGIN, THE TRIP DESTINATION, OR A PLACE ALONG A ROUTE THERE BETWEEN, SUCH THAT THE MEDIA CONTENT REFERS TO THE AT LEAST ONE PLACE AS PART OF A DEFINED NARRATIVE

1144
RECEIVING BIOMETRIC DATA FROM THE PASSENGER INDICATING A NEUROLOGICAL STATE, WHEREIN THE AT LEAST ONE OF SELECTING OR CONFIGURING ONES OF THE MEDIA COMPONENTS IS FURTHER BASED ON THE BIOMETRIC DATA

1146
RECEIVING TRIP CONTEXT DATA REGARDING THE PASSENGER RELEVANT TO A PURPOSE OF THE TRIP, WHEREIN THE AT LEAST ONE OF SELECTING OR CONFIGURING ONES OF THE MEDIA COMPONENTS IS DIRECTED TO FURTHERING A PURPOSE OF THE TRIP

1148
FURTHERING A PURPOSE OF THE TRIP IS SELECTED FROM PREPARING THE PASSENGER FOR THE DESTINATION OR REVISITING AN EXPERIENCE AT THE ORIGIN

1150
ONE OR BOTH OF THE DESTINATION OR ORIGIN ARE CHARACTERIZED AS ONE OF: A THEME PARK, A CONFERENCE, AN OUTDOOR ACTIVITY, A SPORTING EVENT, A MUSICAL PERFORMANCE, A DRAMATIC PERFORMANCE, A CINEMATIC EXPERIENCE, A SHOP OR COLLECTION OF SHOPS, A RESTAURANT OR COLLECTION OF RESTAURANTS, A SOCIAL EVENT, OR A HOLIDAY CELEBRATION

1162 — RECEIVING PERSONAL PROFILE DATA REGARDING THE PASSENGER, WHEREIN THE AT LEAST ONE OF SELECTING OR CONFIGURING ONES OF THE MEDIA COMPONENTS IS DIRECTED TO SATISFYING AT LEAST ONE OF THE PASSENGER'S INTERESTS, PREFERENCES, OR SAFETY NEEDS

1164 — PRODUCING THE MEDIA CONTENT FURTHER COMPRISES SIMULATING AT LEAST ONE OF A VEHICLE DRIVER OR FELLOW PASSENGER

1166 — SELECTING OR CONFIGURING IS FURTHER BASED ON USER PREFERENCE INFORMATION FOR MULTIPLE PASSENGERS IN A VEHICLE AND THE PRODUCING FURTHER COMPRISES PRODUCING DIFFERENT MEDIA CONTENT FOR DIFFERENT ONES OF THE PASSENGERS BASED ON EACH PASSENGER'S USER PREFERENCE INFORMATION

1168 — DETERMINING WHETHER ONES OF THE MEDIA COMPONENTS ARE QUALIFIED FOR USE DURING THE TRIP BASED AT LEAST IN PART ON ONE OR MORE OF A TIME OF THE TRIP, THE ORIGIN, THE DESTINATION AND THE ESTIMATED DURATION

1170 — PRODUCING FURTHER COMPRISES AT LEAST ONE OF SELECTING OR CONFIGURING THE MEDIA COMPONENTS BASED ONE OR MORE PLACES ALONG A ROUTE BETWEEN THE ORIGIN AND THE DESTINATION, SUCH THAT THE MEDIA CONTENT AUGMENTS OR REPLACES REAL SCENERY WITH RELATED ALTERED OR FANTASY SCENERY

1182 — RECEIVING TRAVEL EVENT INFORMATION COMPRISES RECEIVING A SIGNAL FROM A TRANSMITTER BASED ON PROXIMITY OF THE PLAYER DEVICE TO A PLACE OF INTEREST ALONG THE ROUTE, WHEREIN THE SIGNAL INDICATES A LOCATION OF THE PLACE OF INTEREST

1184 — DETERMINING WHETHER TO OUTPUT AN OFFER TO A USER OF THE PLAYER DEVICE, WHEREIN THE SIGNAL INDICATES THE OFFER

1186 — DETERMINING WHETHER TO OUTPUT THE OFFER BASED ON ONE OR MORE OF A USER PROFILE, A USER PREFERENCE, LOG-LEVEL USER DATA, OR TRIP DATA

1188 — DETERMINING WHETHER TO OUTPUT THE OFFER BASED ON A PREDICTIVE ALGORITHM DETERMINING THAT A LIKELIHOOD OF THE USER ACCEPTING THE OFFER EXCEEDS A THRESHOLD

REAL-TIME ROUTE CONFIGURING OF ENTERTAINMENT CONTENT

CROSS-REFERENCE TO RELATED APPLICATION

The present application is a U.S. National Stage under 35 USC 371 of International Application No. PCT/US2019/067284, filed Dec. 18, 2019, which claims priority to U.S. Provisional Application Ser. No. 62/782,306 filed Dec. 19, 2018, the disclosures of both of which are incorporated herein in their entireties by reference.

FIELD

The present disclosure relates to methods and systems for producing real-time media content customized for a travel event in a dynamic travel route.

BACKGROUND

Connected vehicles are equipped with network access, usually via a wireless network, such as wireless mesh network, allowing the vehicles to share network access, for example Internet access, with other devices both inside as well as outside the vehicles. Often, the vehicles are equipped with technologies and applications that tap into the wireless network, including the Internet, to provide benefits to the travelers, including the drivers and the passengers, e.g. traveler information applications. Currently, traveler information applications use a variety of technologies to allow the travelers to make informed decisions regarding trip departures and routes, and to report vehicle environmental conditions. However, these applications have not taken advantage of existing and newer technologies in connected vehicles, for example mixed reality, including augmented and virtual reality, to provide the travelers with benefits for entertainment and other services more specific to events in their travel routes.

It would be desirable, therefore, to develop new methods and systems for production and control of media content that is customized in real-time for a travel event in a travel route to be presented to the travelers in connected vehicles between an origin and a destination, that overcome these and other limitations of the prior art and deliver more compelling entertainment experiences for the travellers of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method is disclosed for producing real-time media content customized for a travel event in a dynamic travel route between an origin and a destination of a connected vehicle. As used herein, a travel event is an event experienced by a moving client device (e.g., a smart vehicle or smartphone) associated with a traveler relative to a trip. Travel events may include, for example, leaving or arriving at any place along a route of travel, detecting arrival or departure of a companion device during travel (e.g., when a passenger with the device enters or leaves a vehicle), achieving or losing a rate of speed, acceleration, direction of travel or progress, changing an estimated arrival time, encountering a delay, a biometric response of a passenger, passenger input to a client device concerning the trip, and so forth. Using one or more processors of a client device and/or server, the method configures entertainment content for the moving client device based on detection of one or more travel events and other factors, enabling passengers and others to experience entertainment that is tied to their present locale and route or progress to their destination.

In an aspect, the connected vehicle may be coupled to a mobile mesh network. As the connected vehicle travels along a route, it may connect to and exchange data with servers of a mobile mesh network or other network based at least on proximity to the vehicle, quality of wireless connectivity between each prospective mobile mesh network server and a receiver, for example a media player within the connected vehicle, or servers at places of interest. As used in the present disclosure, connected vehicles may be referred to simply as vehicles and may include various suitable types of vehicles, whether driven autonomously or driven by a person. Connection and disconnection of nodes of the mobile mesh network may themselves be travel events.

The method may include maintaining, at a server, a data structure of media production data. In an aspect, the media production data may include a media content such as an audio video work, for example a movie, a television show or series, an advertisement, and the like. The data structure may further include an ordered arrangement of media components for the media content, for example audio video clips or an episode of a series and the like. The method may further include determining associations of the media components with one or more parameters indicating user-perceivable characteristics of the media component, including at least an indicator of semantic meaning (e.g., a tag or hashtag) or structural meaning (e.g. duration) relevant to one or more travel events, and optionally other metadata depending on the nature of the media component. The media component may further be associated with or identified by descriptive metadata, for example episode of a program series, ratings, and so on. In an aspect, the media content may include a defined narrative, such as in a movie or episode of a dramatic series, or may lack any defined narrative, as in a video game, recorded music, music video, or other recorded artistic presentation.

The method may further include receiving, by the server, travel event information including at least the travel trip's origin, destination, an estimated duration, and places along the trip's route. Based on the travel event information, the server produces and streams media content for output by the media player device in the vehicle during the trip at least in part by at least one of selecting or configuring the media components based at least in part on one or more of the trip's destination, the estimated duration, and the places along the trip's route. In an aspect, time of the travel may also be used in the selection or configuration of the media components. In an aspect, the selected or configured media components refer to at least one place or area as part of the defined narrative.

In another aspect, the media player may receive the travel event information and render the media content for output in the vehicle.

In an aspect, the selected or configured media components may be based on a targeted portion of the route, for example, a duration of the trip, a distance, orientation, altitude, relative position (e.g. in relation to another vehicle in a group of vehicles), or geographical section. The selection or configuration may allow the completion of the defined narrative within the targeted portion of the route.

In another aspect, the selected or configured media components may be based on user preference information for the driver or one or more passengers in the vehicle, or on biometric data received from the travelers (driver or passengers) indicating a neurological state. In general, drivers are occupied with driving and therefore, cannot safely consume most entertainment content while driving apart from audio content such as, for example, music or talk. While the technologies described herein can be applied to customize audio content for drivers, the focus of the application is on customizing general content, including for example video content and mixed reality content, for passengers in autonomous or human-driven vehicles who are able to focus their attention elsewhere than the road. Accordingly, as used herein "passenger" includes all vehicle occupants to the extent their attention will not be diverted by entertainment from safely driving the vehicle, including non-drivers for all forms of content described herein and drivers only for non-distracting content, including mainly hands-free audio, imagery, olfactory or tactile content presented at times and in modes that will not distract the driver from driving, e.g. including transforms such as text-to-speech, scene analysis with verbal commentary, object recognition with verbal commentary, or via non-obtrusive heads-up display graphics. Significant use cases for the present technology include autonomous vehicles in which all occupants are passengers and no danger of distracting the driver by entertainment content exists. Use cases may also include human-driven vehicles, in which the entertainment content should be presented in a mode that does not distract the driver, for example, on a mobile device or mixed reality headset.

Passenger information may be used to select or configure media components to satisfy at least one of the passenger's interests, preferences, or safety needs. Other information used may include travel context data regarding the traveler relevant to a purpose of a trip, for example time, place, booking information, stated reason, such that the media components are directed to furthering the purpose of the trip, for example, by preparing the travelers for the destination or revisiting an experience at the origin or places along the route. A purpose of a trip may be determined based on the origin or destination, or both, for example, a theme park, a conference, an outdoor activity, a sporting event, a musical performance, a dramatic performance, a cinematic experience, a shop or collection of shops, a restaurant or collection of restaurants, a social event, or a holiday celebration. In an aspect, the purpose of the trip may be determined or received from a tour application. These purposes may be dynamically changed during the trip, as can destinations, routes, preferences, and affinities.

The method may further include simulating at least one of the vehicle driver or a fellow passenger for purposes of furthering a narrative or for providing companionship such as a conversational counterpoint for passengers. For example, a passenger's smartphone may contain an application that simulates a character from movies, online video, television, video gaming or other fiction. When the application senses or receives a message informing it that the passenger is traveling, it may activate the character simulation and operate the simulation to entertain or inform the passenger using the voice and mannerisms of the character, e.g. to convey trip safety information in a comforting, familiar or engaging manner.

In an aspect, when the media player receives a signal from a server at a place of interest in proximity to the vehicle, the signal may indicate the location and other information of the place of interest. The information may include an offer to interact with a person or machine at the place of interest, based on, for example the passenger's profile, preference, log-level user data, biometric data, or trip data. In an aspect, an offer that is sent to the vehicle may be based on a predictive algorithm determining that a likelihood of the passenger accepting the offer exceeds a threshold.

In an aspect, the travel route may dynamically change in real-time, for example based on events along the route. Places of interest may also change in real-time, get removed from or added to the route based on, for example, real-time conditions or passengers' preferences. In another aspect, places of interest may be moving objects along the travel route, for example, a vehicle with specific identification (for example a bus with a specific billboard).

In an aspect, the player device may include mixed reality output (including augmented and virtual reality). In an example, the media components may be selected or configured based on one or more places along the route between the origin and the destination, such that the media content augments or replaces real scenery with related, altered or fantasy scenery. The media components may include 3D data or models suitable for rendering elements. In an alternative aspect, or in addition, the media components may include pre-rendered data.

The methods described herein provide an automated process for producing real-time media content customized for a travel event in a dynamic travel route between an origin and a destination of a connected vehicle. Applications for the methods may include, for example, producing customized real-time audio video content having real or imaginary information for a tour route. The content may be presented in augmented reality or virtual reality, collectively referred to as mixed reality (xR). The xR presentation may include, for example an avatar guide, e.g. providing educational information for places of interest along the route. Vendors near the route can send offers based on destination, vehicle or passenger information. Another application may include, for example producing customized real-time audio video content allowing the passengers to be immersed in an xR theme park ride, using the route either as a private roadway in the park, or as a public roadway. The customized real-time audio video content may also transform the environment along the route, for example the landscape along the route can become an imagined world, for example a voyage into the future or past, or into the imaginary world of a movie or a game. Another application may include geotagging for content generation and licensing. When the vehicle passes geotagged places along the travel route, it unlocks contents based on predetermined conditions. Another application may include, for example producing enhanced travel games or customized games based on trip information. Non-travel games may include strategy games, first-person shooter games, role-playing games, and so forth. The passengers may also play or share information with same-vehicle passengers or with passengers in other connected vehicles in network proximity, on the same route, or on other routes (e.g. a social experience or game played among passengers dispersed in vehicles participating in Poughkeepsie NY, Pacoima CA, and Paris France. The methods may include keeping scores and providing rewards based on scores or other criteria and provide a social network for the passengers on the same route or on other, related routes, e.g. the aforementioned social experience or game. In another application, goods may be delivered to the passengers as the vehicle passes places of interests or geotagged places. For example, a place of interest delivers goods offered by that place as the vehicle is approaching or stops at the place. In an aspect, drones may deliver the goods to the vehicle based on shared information.

The foregoing method may be implemented in any suitable programmable computing apparatus, by provided program instructions in a non-transitory computer-readable medium that, when executed by a computer processor, cause the apparatus to perform the described operations. The processor may be local to the apparatus and user, located remotely, or may include a combination of local and remote processors. An apparatus may include a computer or set of connected computers that is used in audio video production or for output of audio video content to one or more users. An audio video output device may include, for example, a personal computer, mobile phone, notepad computer, mixed reality device, virtual reality device, augmented reality device, or special-purpose hardware for vehicles. Special-purpose hardware for vehicles may include, for example, window glass equipped with one or more LCD layers or other equipment for augmented reality or conventional display, projectors with projection screens that may be embedded or that pop up, roll down, or otherwise become apparent, incorporated into the vehicle interior; seats equipped with motion-simulating and/or motion-damping systems; vehicle audio systems; and active vehicle suspensions. Other elements of the apparatus may include, for example, an audio output device and a user input device, which participate in the execution of the method. An apparatus may include a virtual, augmented, or mixed reality device, such as a headset or other display that reacts to movements of a user's head and other body parts. The apparatus may include biometric sensors that provide data used by the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 11A-11E illustrate a flow diagram of a process for producing real-time media content customized for a travel event in a travel route between an origin and a destination of a connected vehicle.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
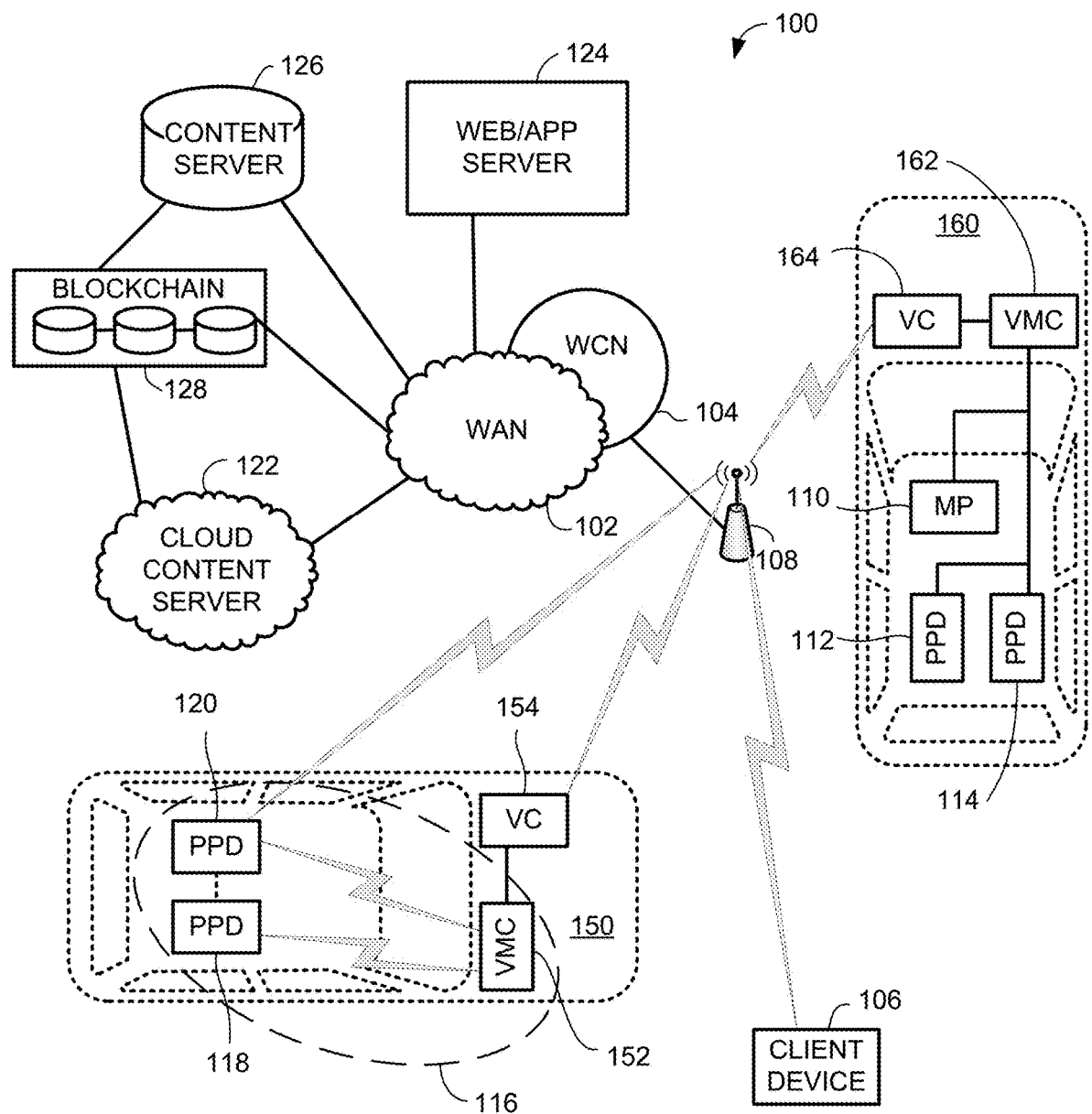
FIG. 1 is a schematic block diagram illustrating aspects of a system and apparatus for providing route-configured audio video content to client devices in one or more vehicles.

Referring to FIG. 1, methods for producing real-time media content customized for a travel event in a dynamic travel route between an origin and a destination of a connected vehicle 150, 160 may be implemented in a network 100. Other architectures may also be suitable. In a network architecture, sensor data can be collected and processed locally, and used to control streaming data from a network source. In alternative aspects, audio-video content may be controlled locally, and log data provided to a remote server. As used herein, "media content" includes digital audio, video, audio-video and mixed reality content that is arranged at least in part by a script or plan designed to entertain, inform, or otherwise engage passengers. The media content may also be configured to support interactive features resembling video game features or may be devoid of interactive features except for responding to data indicative of user's location, preferences, biometric states or affinities.

The methods may include using passenger (or user) information to select or configure media components to satisfy at least one of the passenger's interests, preferences, or safety needs. Other information used may include travel context data regarding the passenger relevant to a purpose of a trip, for example time, place, booking information, stated reason, such that the media components are directed to furthering the purpose of the trip, for example, by preparing the passengers for the destination or revisiting an experience at the origin or places along the route. The method may determine a purpose of a trip based on the origin, points along the route, or the destination. In an aspect, the purpose of the trip may be determined or received from a ride-hailing or tour-booking application. When there are multiple passengers in a vehicle, the methods may include producing different media content for different passengers based on each passenger's user preference information or biometric data. The methods may further include combining multiple players' preferences or affinities—some discovered before, during or after a trip—or biometric data into common, shared media content, or media content that is relevantly configured for each passenger or set of passengers.

In an aspect, the methods may include producing media content having xR content. In an example, the methods may include selecting or configuring the media components based on one or more places along the route between the origin and the destination, such that the media content augments or replaces real scenery with related altered or fantasy scenery. The media components may include 3D data or models suitable for rendering elements. In an alternative aspect, or in addition, the media components may include pre-rendered data.

As will be shown further herein below, the content server may share travel information with servers at places (or points) of interest along the route. Having the travel information, in an aspect, when the media player in a vehicle receives signal from a server at a place of interest along the route and in proximity to the vehicle, the signal may indicate the location and other information of the place of interest. The information may include an offer to interact with a person or machine at the place of interest, based on, for example the passenger's profile, preference, log-level user data, biometric data, or trip data. In an aspect, an offer is sent to the vehicle that may be based on a predictive algorithm determining that a likelihood of the passenger accepting the offer exceeds a threshold.

In an aspect, the methods may further include using predictive algorithms in selecting or configuring media components. A predictive algorithm process may predict an affinity of a user of the player device based at least in part on user profile data and the travel information. The affinity may then become part of the user profile and travel information.

In an aspect, the travel route may dynamically change in real-time, for example based on events along the route. In an aspect, sensors at the vehicle may detect and report the changes to one or more servers. Based on the changes, the servers may select or configure new media components, producing new media content for output at the vehicle. In another aspect, the servers may receive changes to the route from the sources of the travel information, for example, a tour app. Places of interest may also change, get removed from or added to the route in real-time based on, for example, real-time conditions or passengers' preferences. Conditions may include conditions of the places of interest or of the route, etc. In another aspect, places of interest may be moving objects along the route, for example, a particular vehicle with specific identification (for example a bus with a specific billboard). As with changes in the route, changes in the places of interest may cause the servers to select or configure new media components and produce new media content. In another aspect, the method may further include simulating at least one of the vehicle driver or a fellow passenger, e.g. an audiovisual tour, safety or other guide. The simulation may provide gaming capabilities, or social networking.

In another aspect, passengers may select and configure the media experience desired during one or more trips. For example, a system as described herein may enable a passenger to select one or more of:

(a) A group experience underway from an enumerated list that provides sufficient detail of names/route/genre. Further, a newly configured or formed group could result from taking a trip, therefore the group experience may be dynamic. Group experiences may be analogous to joining an Internet chat room based on affinity, friends, current activity or size.

(b) A new individualized experience. This may be a hyper-personalized experience that will be constructed in real-time.

(c) A simulation of a prior experience (group or individual), or in the style of a prior experience, that is searched for by identifier (e.g. Lewis' Excellent Pacoima Adventure). By example, if you're in apple orchard country and want an experience like your friend's tour of wine country, the system may reconfigure your friend's experience for you by substituting cider-making fruit orchards for vineyards. Passengers may select from prior experiences of their own, those shared by friends, or commercial prior experiences promoted by celebrities, influencers or brands.

In a related aspect, the system may enable selecting before, during, and after trips. The system may base prior selection on offers or another pre-trip planning interaction via a ride-hailing application, travel-planning application, ticket sales application, or other application that interacts with the trip. The system may provide selecting during a trip based on real-time decisions during the trip, or at literal choice points along the way such as stops along the route. The system may provide post-trip selection, for example offers from stores or other venues visited during the trip, or by you checking in at some sites that are known to offer repeat visit or repeat business incentives or some such. The system may provide a join process upon starting a journey, almost like selecting a route on the navigation, but in this case choosing one's adventure/entertainment.

A suitable network environment 100 for practice of the methods summarized above may include various computer servers and other network entities in communication with one another and with one or more networks, for example a Wide Area Network (WAN) 102 (e.g., the Internet) and/or a wireless communication network (WCN) 104, for example a cellular telephone network using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") connect directly, dynamically to as many other nodes as possible and cooperate with one another to efficiently route data from/to client devices. This lack of dependency on one node allows for every node to participate in the relay of information. Mesh networks may use peer nodes that dynamically self-organize and self-configure. In an alternative, servers may connect to client devices in a server-client structure. Some client devices can also act as servers.

Client devices may include, for example, portable passenger devices (PPDs) such as smartphones, smartwatches, notepad computers, laptop computers, and mixed reality headsets, and special purpose media players and servers, here called vehicle media controllers (VMCs) installed as part of vehicular electronic systems. VMCs 152, 162 may be coupled to vehicle controllers (VCs) 154, 164 as a component of a vehicular control system. The VC may control various other functions with various components, for example, engine control, interior climate control, interior or exterior lighting, which can be located in/on the vehicle(s) or in locations that can be seen by passengers in the subject vehicle(s), or by others participating in a shared experience such as a multi-vehicle scavenger hunt with roadside clues, anti-lock braking, navigation, audio configuration (e.g. mono, stereo, multichannel, object-oriented, of individual-passenger-oriented, beamed of otherwise focused audio only for some passenger(s), video functions such as pop up or roll down screens or projectors or multi-layer window opacity/transparency or other means to render sights, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and Javascript documents or executable scripts, for example. The environment 100 may include one or more content servers 126 for holding or transforming data, for example video, audio-video, audio, and graphical content components of media content for consumption using a client device, software for execution on or in conjunction with client devices, and data collected from users or client devices. Data collected from client devices or users may include, for example, sensor data and application data. Sensor data may be collected by a background (not user-facing) application operating on the client device, and transmitted to a data sink, for example, a cloud-based content server 122 or discrete content server 126. Application data means application state data, including but not limited to records of user interactions with an application or other application inputs, outputs or internal states. Applications may include software for selection, delivery or control of media content and supporting functions. Applications and data may be served from other types of servers, for example, any server accessing a distributed blockchain data structure 128, or a peer-to-peer (P2P) server 116 such as may be provided by a set of client devices 118, 120, 152 operating contemporaneously as micro-servers or clients.

In an aspect, information held by one or more of the content server 126, cloud-based content server 122, distributed blockchain data structure 128, or a peer-to-peer (P2P) server 116 may include a data structure of media production data in an ordered arrangement of media components for route-configured media content. The data structure may relate user-perceivable aspects of media components to identifiers of the media components and to one or more indicators of semantic meaning relevant to one or more travel events, and other unique metadata sets characterizing each of the components. As used herein, a "media component" is a discrete package or collection of data that encodes a component of media content. Media components may include, for example, "media segments," which are sets of audio, video, audio-video, or other encodings of sensory output by a media player having a beginning, ends, and duration. An audio clip, a video clip, or an audio-video clip are examples of a media segment. Media segments may comprise parallel tracks of encoded data, each of which is itself a media segment. For example, an audio-video segment includes a video segment in parallel to an audio segment. If the media player supports other sensory output modalities, other types of media segments may include, for example, a motion simulation segment for driving a motion simulator, an olfactory segment for driving an odor generator, a tactile segment for driving a tactile output device, and so forth. A component of the system may transform one modality of output to another, e.g. text-to-speech for a driver, or speech-to-text social media notifications on an ancillary screen for a passenger already engaged by a main program. Other media components are not segments but nonetheless are data that encodes sensible output. For example, three-dimensional (3D) model data and related texture data are not media segments but once rendered by a game engine will appear in output media content and are necessary to render the content.

As used herein, users (who can also be passengers) are consumers of media content. When actively participating in content via an avatar or other agency, users may also be referred to herein as player actors. Consumers are not always users. For example, a bystander may be a passive viewer who does not interact with the content or influence selection of content by a client device or server.

The network environment 100 may include various passenger portable devices, for example a mobile smartphone client 106 of a user who has not yet entered either of the vehicles 150, 160. Other client devices may include, for example, a notepad client, or a portable computer client device, a mixed reality (e.g., virtual reality or augmented reality) client device, or the VMCs 152, 162. PPDs may connect to one or more networks. For example, the PPDs 112, 114, in the vehicle 160 may connect to servers via a vehicle controller 164, a wireless access point 108, the wireless communications network 104 and the WAN 102, in which the VC 164 acts as a router/modem combination or a mobile wireless access point (WAP). For further example, in a mobile mesh network 116, PPD nodes 118, 120, 152 may include small radio transmitters that function as a wireless router. The nodes 118, 120, 152 may use the common WiFi standards to communicate wirelessly with client devices, and with each other.

Mesh network nodes may be programmed with software that tells them how to interact within the larger network. By following a set of common mesh network protocols, the mesh network nodes may transport information across the network by hopping the information wirelessly from one mesh node to the next. The nodes may automatically choose the quickest and most reliable path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity". In general, client devices may be, or may include, computers or media players used by users to access media content provided via a server or from local storage. In traveling vehicles such as the example vehicles 150, 160, use of a mobile mesh network protocol may enable nearby vehicles to share network bandwidth and information more efficiently using different frequencies and cached content.

For example, passengers in two or more vehicles 150, 160 traveling to a popular destination such as a sporting event or theme park may be interested in the same or similar content. Continuing the example, suppose that the first vehicle 150 has already downloaded many media components making up the shared content and its mobile mesh network 116 comes within range of the second vehicle 160. Then, one or more of the VMC 162, media player (MP) 110 and PPDs 112, 114 join the mesh network 116. Once the new nodes have joined, the original nodes 118, 120, 152 of the mesh network 116 may cooperate to transmit media components or other data to the new nodes in the second vehicle 160, without needing to pass data through the WCN 104 or WAN 102. Thus, demands on other networks may be reduced. Mesh networks may be useful in delivering route-configured content because client devices in vehicles following similar routes may be both more likely to request similar content and to be relatively near to each other. A lead vehicle's passengers' selections or otherwise determined preferences may also signal what following passengers would like to experience if following vehicle passengers have similar or overlapping preferences, particularly if the lead vehicle's passengers' engagement (e.g. biometrically measured) by certain route-related content reaches certain thresholds.

Figure 2A:
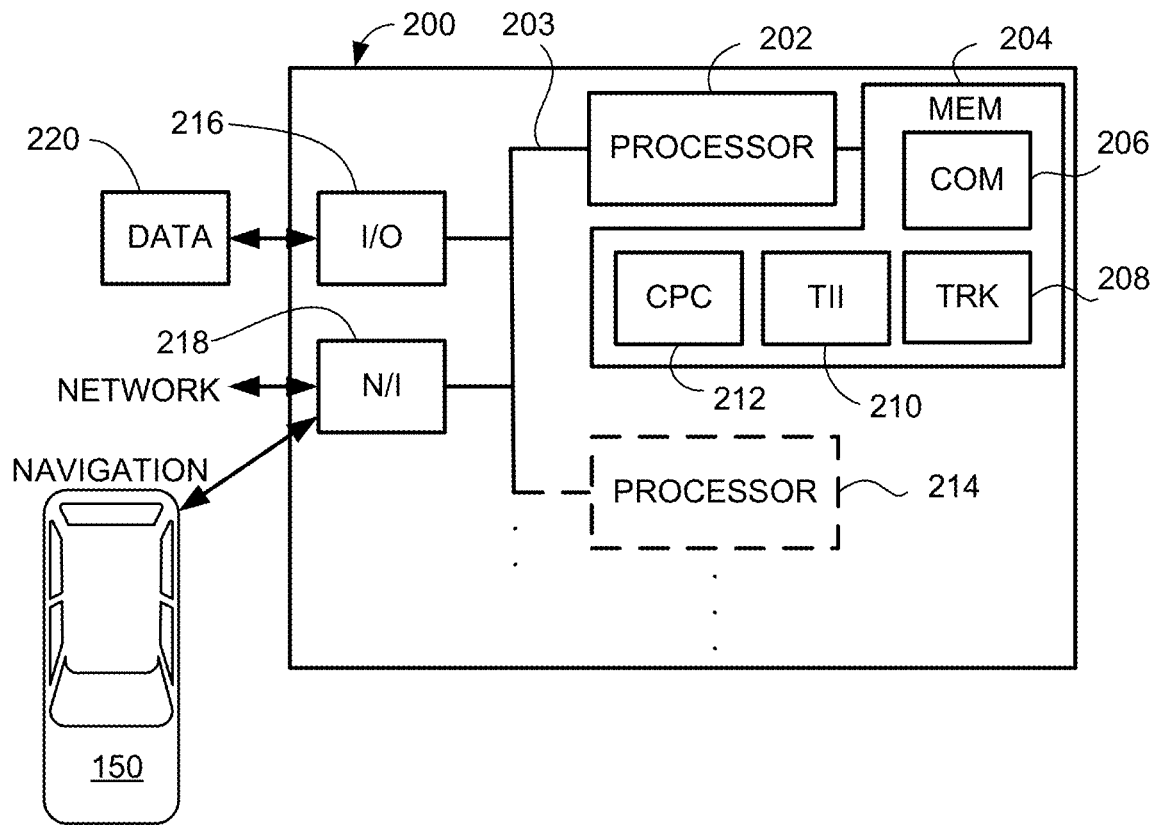
FIG. 2A is a schematic block diagram illustrating aspects of a server for delivering route-configured audio video content.

FIG. 2A shows a media content server 200 for controlling output of digital media content, which may operate in the environment 100, for example as an VMC 152, 162 or content server 122, 126, 128. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle or travel conditions. Suitable sources may include, for example, Global Positioning System (GPS) or other geolocation sensors, one or more cameras configuring for capturing road conditions and/or passenger configurations in the interior of the vehicle 150, one or more microphones for detecting exterior sound and interior sound, one or more temperature sensors for detecting interior and exterior temperatures, door sensors for detecting when doors are open or closed, and any other sensor useful for detecting a travel event or state of a passenger. Some types of servers, e.g., cloud servers, server farms, or P2P servers, may include multiple instances of discrete servers 200 that cooperate to perform functions of a single server.

The server 200 may include a network interface 218 for sending and receiving applications and data, including but not limited to sensor and application data used for controlling media content as described herein. The content may be served from the server 200 to a client device or stored locally by the client device. If stored local to the client device, the client and server 200 may cooperate to handle sensor data and other player actor functions. In some embodiments, the client may handle all content control functions and the server 200 may be used for tracking only or may not perform any critical function of the methods herein. In other aspects, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking travel events using sensor data from the source(s) 220 and/or navigation and vehicle data received through the network interface 218 or other coupling to a vehicle controller. In some embodiments, the tracking module 208 or another module not shown may track emotional responses and other interactive data for one or more passengers, subject to user permissions and privacy settings.

The modules may further include a trip information integration (TII) module 210 that when executed by the processor causes the server to perform any one or more of determining associations of media components with one or more parameters indicating user-perceivable characteristics of a media component, including at least an indicator of semantic meaning relevant to one or more travel events. For example, the TII module 210 may determine input parameters including a trip destination for one or more passengers, current road conditions, and estimated remaining travel duration based on data from the tracking module 208, and apply a rules-based algorithm, a heuristic machine learning algorithm (e.g., a deep neural network) or both, to create one or more sets of media component identifiers consistent with the input parameters. The TII module 210 may perform other or more detailed operations for integrating trip information in media component selection as described in more detail herein below. For example, during a storm or other rough driving conditions, music selection (e.g. playlists) may provide calming influences. Interior vehicle lighting may also be switched to muted, blue tones, as the interior temperature can be subtly raised so as to be comforting and cozy.

The modules may include, for example, a media production or configuration process (CPC) module 212. The CPC module 212 may include instructions that when executed by the processor 202 and/or 214 cause the server 200 to perform one or more of producing or configuring media content for output by a player device during the trip at least in part by at least one of selecting or configuring ones of the media components based at least in part on one or more of the trip destination and the estimated duration, and further operations as described in more detail herein below. The memory 204 may contain additional instructions, for example an operating system, and supporting modules.

Figure 2B:
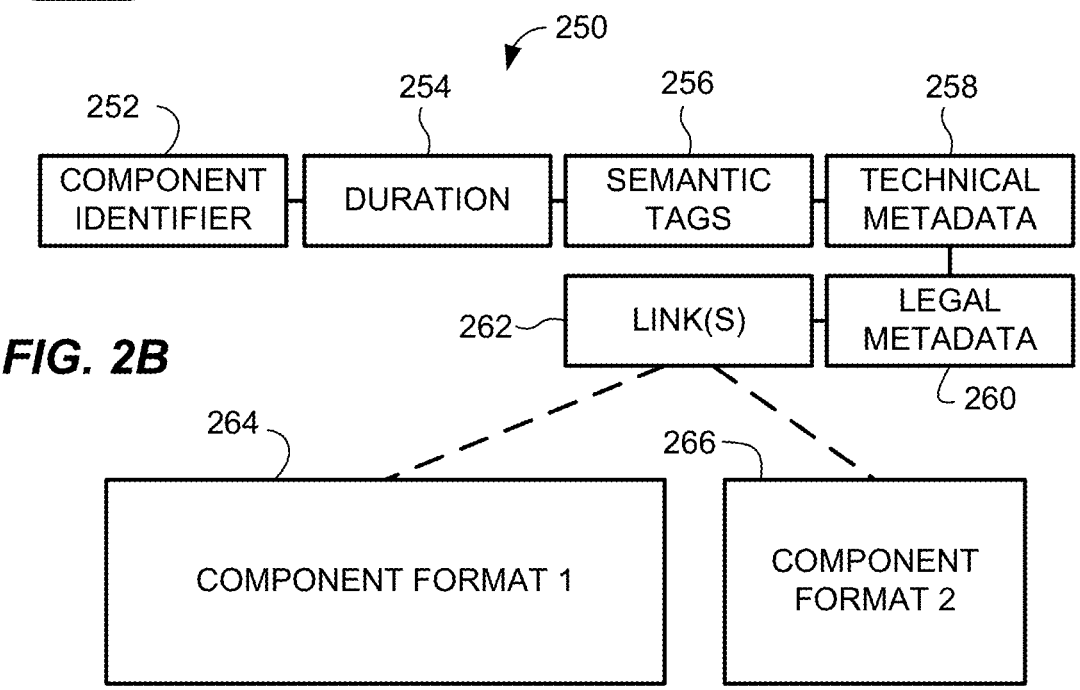
FIG. 2B is a schematic block diagram illustrating an example of a data structure for relating components of media production data to travel event and other data.

Systems, apparatus and methods as described herein may make use of a data structure that relates media production data in an ordered arrangement of media components to one or more parameters for media content, including at least one or more indicators of semantic meaning relevant to one or more travel events. FIG. 2B shows an example of a data structure 250 for relating components of media production data each referenced by a component identifier 252 to travel event and other data. The data structure may be implemented as a relational database, a flat data table, a distributed ledger, or by any other useful computer-readable digital data structure for storing, locating and accessing related components of binary-encoded data. The data structure 250 may include self-associated records each including a unique identifier 252 of a media component (e.g., an index number), a duration 254 value (e.g., frames or seconds) of a media segment if applicable, one or more semantic tags 256 relevant to travel event information, technical metadata 258 as needed to select, configure or produce media content that includes the media component identified by the identifier 252, legal metadata such as for example license or censorship requirements applicable to the media component, and one or more links to non-transitory, computer-readable copies 264, 266 of the media component. The copies 264, 266 may be identical copies for redundancy or more efficient distribution, may be copies in different formats (e.g., a large format 264 and a small format 266) for different output modes, or both. It may be efficient to store the copies 264, 266 in a different storage system than the metadata 250 for more efficient operation of the server 200. For example, the server 200 may load the data structure 250 into its Random Access Memory (RAM) and access the component copies 264, 266 on a remote server or local magnetic or electronic memory device.

Figure 3:
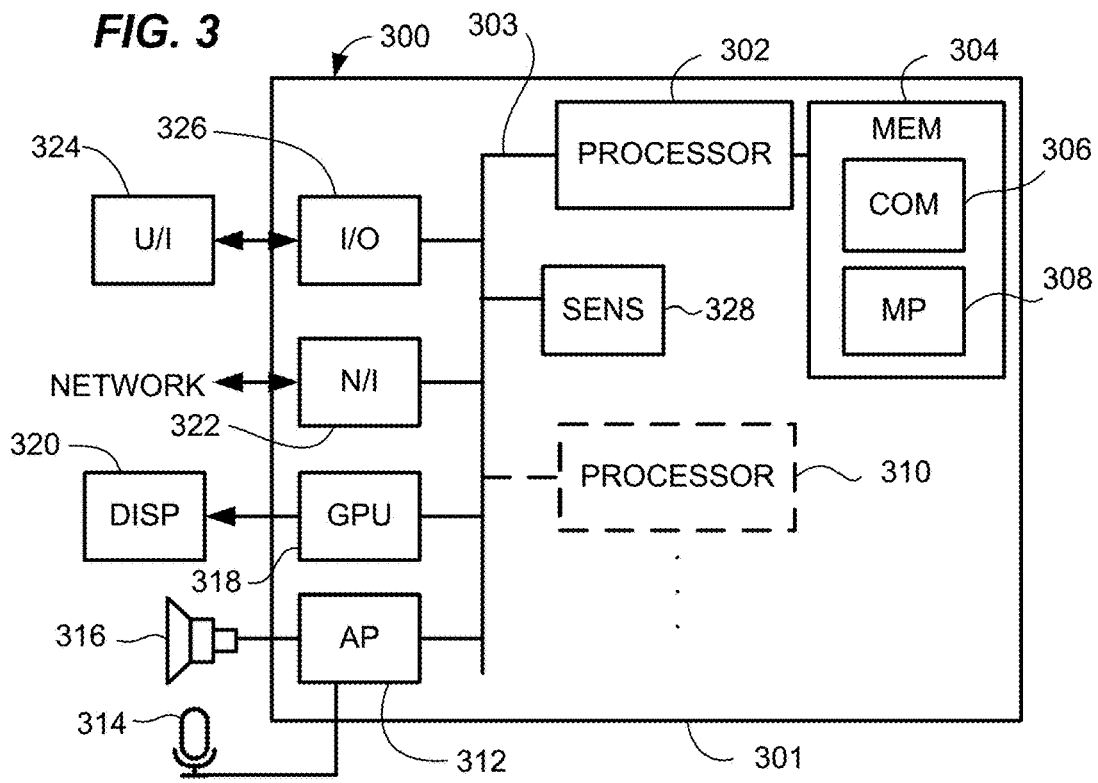
FIG. 3 is a schematic block diagram illustrating aspects of a client device for controlling output of route-configured audio video content.

FIG. 3 shows aspects of a content consumption device 300 for controlling output of digital media content. In some embodiments, the same computing device (e.g., device 300) may operate both as a content consumption device and as a content configuration server, for example, as a node of a mesh network. In such embodiments, the computing device may also include functional modules and interface devices as described above for the server 200.

For content consumption, the apparatus 300 may include a processor 302, for example a central processing unit, a system-on-a-chip, or any other suitable microprocessor. The processor 302 may be communicatively coupled to auxiliary devices or modules of the apparatus 300, using a bus or other coupling. Optionally, the processor 302 and its coupled auxiliary devices or modules may be housed within or coupled to a housing 301, for example, a housing having a form factor of a television, active window screen, projector, smartphone, portable computing device, wearable goggles, glasses, visor, or other form factor.

A user interface device 324 may be coupled to the processor 302 for providing user control input to a process for controlling output of digital media content in response to travel event information. The process may include outputting video and audio for a conventional flat screen or projection display device. In some aspects, the media control process may include outputting audio-video data for an immersive mixed reality content display process operated by a mixed reality immersive display engine executing on the processor 302. In some aspects, the process may include outputting haptic control data for a haptic glove, vest, or other wearable; motion simulation control data, or control data for an olfactory output device such as an Olorama™ or Sensoryco™ scent generator or equivalent device.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB) or equivalent port. Control input may also be provided via a sensor 328 coupled to the processor 302. A sensor may comprise, for example, a motion sensor (e.g., an accelerometer), a position sensor, an orientation sensor (e.g. magnetometer or altimeter), a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a radio receiver, a multi-camera tracking sensor/controller, an eye-tracking sensor, a microphone or a microphone array. The sensor or sensors 328 may detect biometric data used as an indicator of the user's emotional state, for example, facial expression, skin temperature, gaze detection, pupillary dilation, respiration rate, muscle tension, nervous system activity, or pulse. In addition, the sensor(s) 328 may detect a user's context, for example an identity position, size, orientation and movement of the user's physical environment and of objects in the environment, motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspects, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server may track users' biometric states and viewing history. Viewing history may include a log-level record of control decisions made in response to player actor biometric states and other input. Viewing history may also include content viewed on TV, Netflix™ and other sources. The server 200 may track user actions and biometric responses across multiple content titles for individuals or cohorts.

Sensor data from the one or more sensors may be processed locally by the CPU 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the media content server 200, the client 300 may include a network interface 322, wired or wireless. Network communication may be used, for example, to enable multiplayer experiences, including immersive or non-immersive experiences of media content. The system may also be used for other multi-user applications, for example social networking, group entertainment experiences, instructional environments, video gaming, and so forth. Network communication can also be used for data transfer between the client and other nodes of the network, for purposes including data processing, content delivery, content control, and tracking. The client may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 320 may be incorporated into a virtual reality headset or other immersive display system. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of biometric state and as a device for user input of sound commands, verbal commands, or for social verbal responses to passengers. The audio transducer 316 may be, or may include, a speaker or piezoelectric transducer integrated to the apparatus 300. In an alternative or in addition, the apparatus 300 may include an audio output port for headphones or other audio output transducer mounted ancillary equipment such as a smartphone, VMC, xR headgear, or equivalent equipment. The audio output device may provide surround sound, multichannel audio, object-oriented audio, or other audio track output from the media content. Additionally, personalized audio that is beamed or otherwise focused at specific passenger's ears or seats within certain ear-location parameters may provide audio for only some, intended passengers.

The apparatus 300 may further include a random-access memory (RAM) 304 holding program instructions and data for rapid execution or processing by the processor, coupled to the processor 302. When the device 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor. The memory 304 may also store data, for example, audio-video data in a library or buffered during streaming from a network node.

Program instructions may be grouped into functional modules 306, 308, to facilitate coding efficiency and comprehensibility, for example, a communications module 306 and a media player module 308. The modules, even if discernable as divisions or grouping in source code, are not necessarily distinguishable as separate code blocks in machine-level coding. Code bundles directed toward a specific type of function may be considered to comprise a module, regardless of whether machine code on the bundle can be executed independently of other machine code. The modules may be high-level modules only. The media player module 308 may perform operations of any method described herein, and equivalent methods, in whole or in part. Operations may be performed independently or in cooperation with another network node or nodes, for example, the server 200.

Figure 4A:
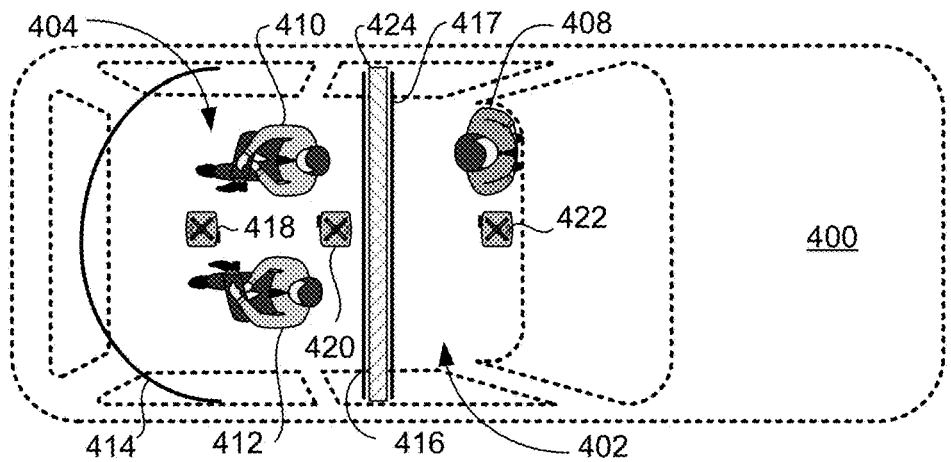
FIG. 4A is a schematic diagram showing features of a human-piloted vehicle equipped for passenger entertainment.

In a motor vehicle, the apparatus 300 may provide video content for projection onto an interior surface of the vehicle as the display 320. For example, in a vehicle 400 shown in FIG. 4A, one or more ceiling-mounted projectors 418, 420, 422 may project media content from the apparatus 300 onto corresponding screens 416, 414, 417. In the illustrated configuration, two passengers 410, 412 sit in a passenger space 404 while a driver 408 occupies a cockpit 402. The cockpit 402 may be isolated from the passenger space 404 by a sound wall 424. The projector 422 may project video from rear-facing cameras of the vehicle 400, showing the rear view for the driver. The projector 420 may project forward media content from the apparatus 300 onto a forward surround screen 414. The projector 418 may project rear media content coordinated in time to the forward media content onto the rear screen 416. "Forward" and "rear" are relative to the passengers' 410, 412 orientations, not the vehicle 400 orientation. Passenger and vehicle orientations may be aligned or non-aligned as shown in FIG. 4A. The rear screen 416 and forward screen 414 may be mounted on tracks enabling separation of the screens 414, 416 to admit or release passengers, and closure to enable a fuller surround view, up to and including a full 360° surround view.

In driverless (e.g., autonomous vehicle) configurations, the sound wall 424, rear view screen 417, projector 422, driver 408 and cockpit 402 are omitted, and the entire cabin of the vehicle 400 may function as a passenger entertainment space 404. In driverless embodiments, the rear projection screen 416 may be a surround screen like the forward screen 414.

Figure 4B:
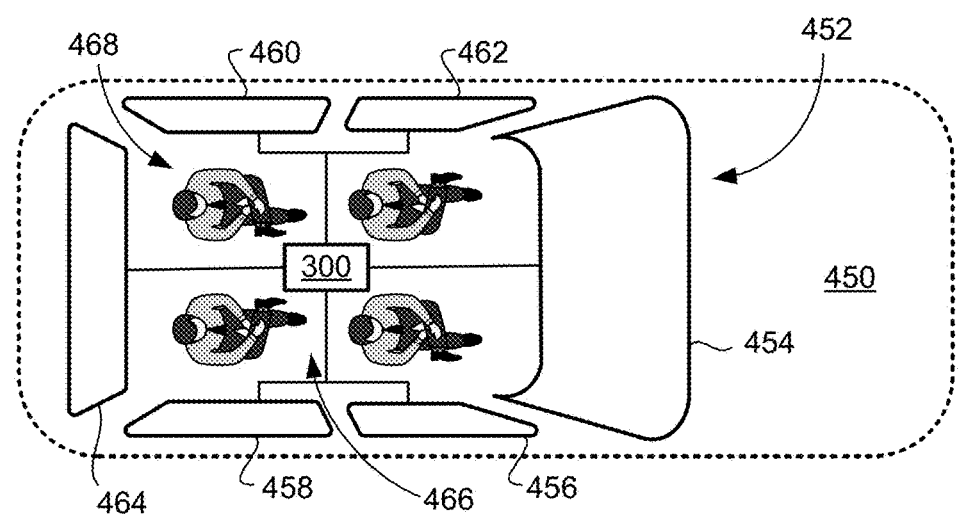
FIG. 4B is a schematic diagram showing features of an autonomous vehicle equipped to passenger entertainment.

Instead of or in addition to projection screens, electronic display screens may be used for display 320, for example, LCD or OLED screens in various resolutions, color spaces and dynamic ranges. In driverless vehicles, the cabin is easily darkened so either projectors or electronic screens should work well. FIG. 4B shows a configuration of an autonomous vehicle 450 in which the window screens are replaced by LCD screens 452, including a front screen 454, right side screens 456, 458 (one on each door) left side screens 460, 462 (one on each door) and a rear screen 464. One or more of the screens 452 may be transparent or partially transparent LCD or OLED panels (also called see-through displays) for augmenting the natural view of the vehicle exterior, may have an opaque backing for virtual reality, or may include an electronic or mechanical shutter to transition between opaque and transparent or partially transparent states. One or multiple LCD layers may be used as an electronic shutter to transition between opaque and transparent states. An apparatus 300 (for example, a VMC 152) may be coupled to the screens 452 for controlling video output. One or more passengers 468 in the cabin 466 may view video content as if looking through the window, in see-through or opaque modes. In alternative embodiments, the vehicle windows are equipped with mechanical or electronic shutters to darken the cabin, and the apparatus 300 outputs the video content to traditional LCD or OLED screens in an interior to the vehicle, or to projectors as shown in FIG. 4A. In an alternative or in addition, each of the passengers 468 may consume the media content on a personal computing device, for example a smartphone, notepad computer or mixed reality headset.

In addition to conventional 2D output or 3D output for display on two-dimensional (flat or curved) screens (e.g., by televisions, mobile screens, or projectors), the media content control methods disclosed herein may be used with virtual reality (VR), augmented reality (AR) or mixed reality output devices (collectively referred to herein as xR). Some immersive xR stereoscopic display devices include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD or OLED display. Other immersive xR stereoscopic display devices use a built-in display screen in a similar frame. Either type may be designed to be worn close to the user's face, enabling a wide field of view using a small screen size such as in smartphone. The support structure may hold a pair of lenses in relation to the display screen. The lenses may be configured to enable the user to comfortably focus on the display screen which may be held approximately one to three inches from the user's eyes. The device may further include a viewing shroud (not shown) coupled to the support structure and made of a soft, flexible or other suitable opaque material for form fitting to the user's face and blocking outside light. The immersive VR stereoscopic display device may be used to provide stereoscopic display output, providing a more immersive perception of 3D space for the user.

Figure 5:
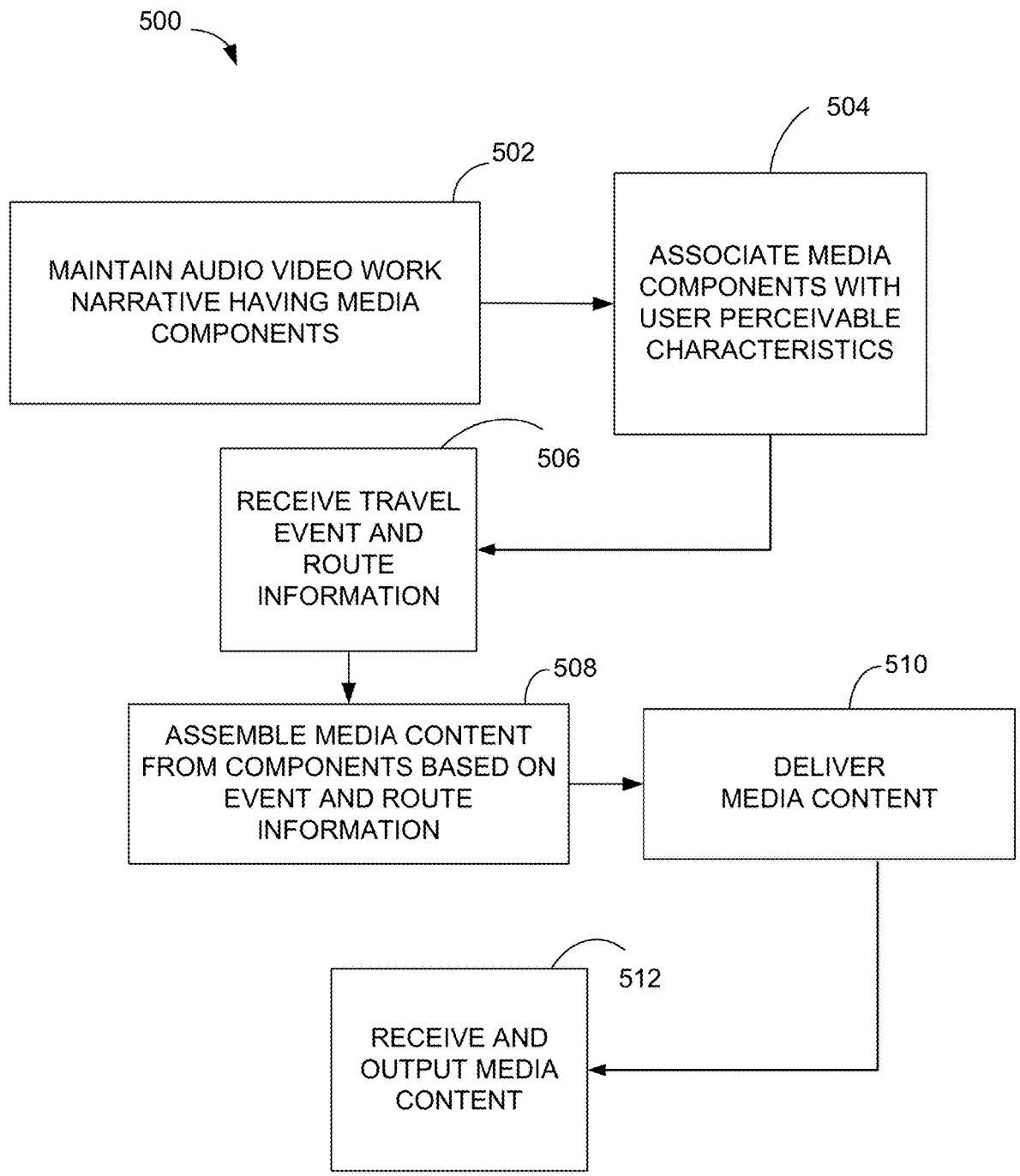
FIG. 5 is a schematic diagram illustrating an overview of configuring, by one or more processors, real-time media content customized for a travel event in a travel route between an origin and a destination of a connected vehicle.

The apparatus 200 and 300 may perform methods for configuring media content, each alone, or working in cooperation. FIG. 5 shows an overview 500 of producing real-time media content customized for a travel event in a travel route between an origin and a destination of a connected vehicle. The method 500 may be performed by one or more computer processors of a server in electronic communication with the connected vehicle and servers at points of interests along the travel route, and/or an independent server of the vehicle not in electronic communication with other vehicle or servers at points of interests. At the process 502, the one or more processors at a content server maintain a data structure holding media production data. The data structure may be of any useful type, for example as described herein above in relation to FIG. 2B. In an aspect, the media production data may include a defined narrative such as audio video work, for example a movie, an episode of a serial drama, a documentary, an infomercial, a video game, an advertisement, a talk show or social game, or other program, animated or not. The data structure may further include an ordered arrangement of media components for the media content, for example audio video clips or an episode of a series and the like.

At the process 504, the method may further include determining associations of the media components with one or more parameters indicating user-perceivable characteristics of a media segment. A media segment may include as little as a single video frame isolation or as much as whole scenes or larger components of a larger program. Media segments may also include digital data for generating audio output, olfactory output, haptic output or any other sensory output, each of the foregoing alone or accompanying associated video or other content. Certain audio/video/text/graphics/olfactory input or output/haptics or other human-perceivable media segment components may be translated to others for specific purposes. For example, for a blind passenger, sights may be rendered via object identification or scene analysis software coupled with audio commentary, or as Braille text-to-speech. For deaf passengers, sounds may be rendered as speech-to-text haptics Braille, or as graphics as in speech-to-text. For the driver—if there is one—otherwise distracting sights (e.g. outside the driver's driving field of view) may also be rendered via object identification or scene analysis software coupled with attendant audio commentary, or as graphics on a heads-up display that does not distract the driver's gaze.

The media segment may fit within a defined narrative. The user-perceivable characteristics may include at an indicator of semantic meaning (e.g., a tag or hashtag) relevant to one or more travel events, and may include other metadata, for example a duration if the media component is a segment, for example a segment of audio, video, or audio-video data (e.g., a video clip). In addition, the processor may associate the media component with an address or other locator (e.g., a link) for the media component using the data structure and use the locator to acquire a copy of the component. In some embodiments, the processor may associate the media component with a logical address (e.g., position) of the component in a narrative tree. The narrative tree may be an organized and/or ordered listing of media segments, for example based on chronological order of the segments within the narrative, including one or more branches leading to alternative storylines. In an aspect, other metadata for the media segment may include, for example, an episode identifier of a program series, ratings, genre, and so on.

At the process 506, the method may, still at the content server, include receiving information about a travel event, including information about a travel route of the travel event. In an aspect of the present disclosure, the sources of the travel information may include another server, or from an application (or "app"), or from a third-party server. For example, the source may be a server or an application from a tour company. In an aspect, travel information may include at least the travel trip's origin, destination, an estimated duration, and places along the trip's route.

At the process 508, based at least in part on one or more of the trip's destination, the estimated duration, and the places along the trip's route, the method may include producing media content by at least one of selecting or configuring the media components from the media database. In an aspect, the selected or configured media components refer to at least one place along the route as part of the defined narrative. In an aspect, time (for example, hour, day, month, season, etc.) of the travel may also be used in the selection or configuration of the media components. The method may also include selecting or configuring and producing the media content based in part on the specifications of the media player at each vehicle, for example whether the media player has 3D or xR capabilities.

At the process 510, the method may include streaming the media content to one or more connected vehicles associated with the travel information. At the process 512, the method may include a media player device at the connected vehicle receiving and outputting the media content at the start, during or at the destination of the trip.

In an aspect, one or more processors at the content server may perform one or more of the processes 502-510. In another aspect, one or more processors at the connected vehicle may perform one or more of the processes 502-510. Therefore, it should be noted that the following descriptions of these processes refer to either the content server or the vehicle, unless noted otherwise.

Figure 6A:
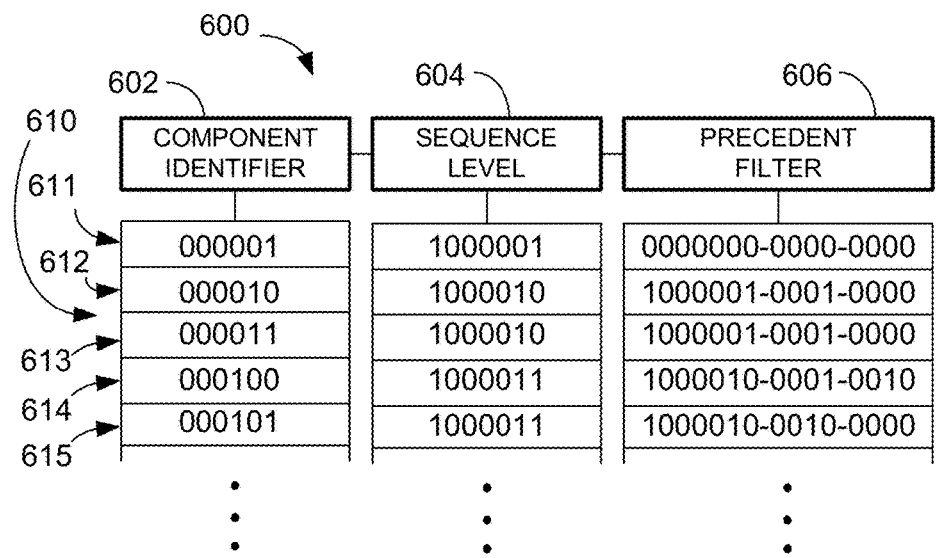
FIG. 6A is a diagram illustrating aspects of a narrative tree data structure for use by one or more processors in determining a logical address of a media component in a narrative tree.

FIG. 6A shows aspects of a narrative tree data structure 600 for use by one or more processors in determining a logical address of a media component in a narrative tree, illustrated as a binary data table representing a directed acyclic graph. A first column 602 holds component identifiers, for example, an index or serial number that is unique for the set of media components of the media content. In an aspect, the identifier may represent a link to a copy of the component. In this example, the column 602 holds a sequence of integers 1, 2, 3 . . . expressed as binary data.

A second column 604 holds at least one narrative level assigned to each media component. Each level may be expressed as one value of an uninterrupted linear sequence, for example the sequence of integers 1, 2, 3 . . . expressed as binary data. To provide a tree structure, at least one media component is assigned to each level, and more than one media component is assigned to at least one of the levels. In many narrative structures, multiple unique media components are assigned to most levels and each media component is assigned to only one level. In some embodiments, a media component may be assigned to multiple narrative levels.

A third column 606 may hold filter criteria for determining eligible media components based on a current narrative level and an identity of a most recent media component last played. In this example, three values are used in the third column 606, displayed as binary numbers separated by dashes. The first value is the prior level identifier, the second value identifies a first segment of a range, and the third value is null ('0000') or identifies a last segment of the range. The range values may be based on the position of each segment in the level, for example, a first position in the level may be identified as '0001,' a second position as '0010,' and so forth.

The rows 610 hold example values in each column to demonstrate application of the data structure 600, for a list of media components beginning with an initial "Segment 1" in row 611, column 602. At row 611, column 604, Segment 1 is assigned to "Level 1," the first level in the tree. The third column 606 is filled with null values indicating no eligible prior components in the tree 600. A "Segment 2" in the second row 612 at column 602 is associated by the table 600 to a second "Level 2" at column 604, as is "Segment 3" at row 613, column 604. At row 612, column 606, three values indicate that Segment 2 is eligible to follow Level 1, Segment 1. The same is indicated at row 613, column 606 for Segment 3, because Level 1 holds only one segment. Segments 4 and 5 at rows 614, 615 respectively are likewise assigned to Level 3. At column 606, row 614, Segment 4 is indicated as eligible to follow the first segment of Level 2 only, which is Segment 2. At column 606, row 615, Segment 5 is indicated as eligible to follow the first or second segments of Level 2, which as Segments 2 or 3. The data structure 600 may be continued for additional media components in like fashion.

Figure 6B:
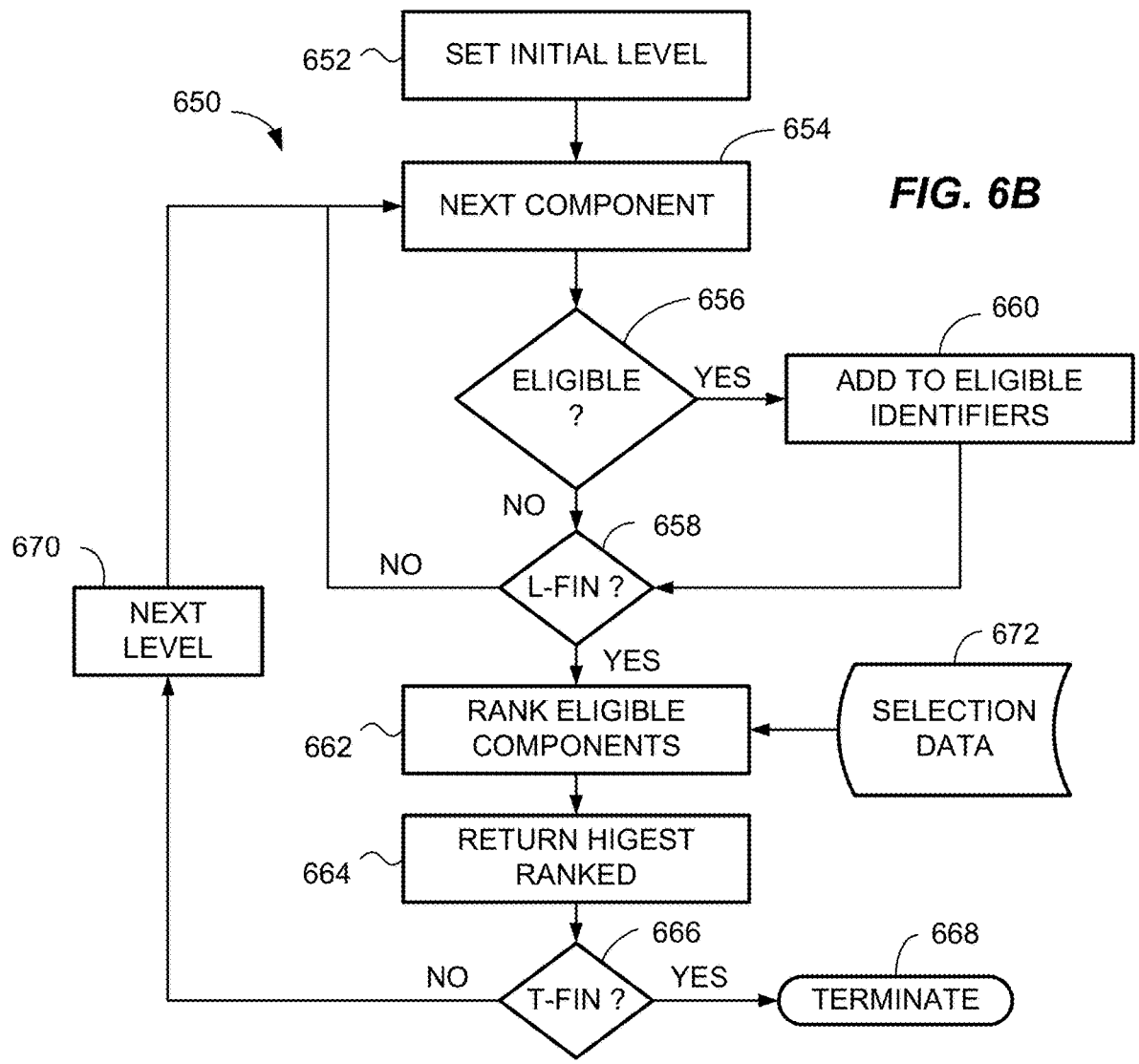
FIG. 6B is a flow chart showing an algorithm for selecting a media component based on an address in a narrative tree.

FIG. 6B shows a method or algorithm 650 for selecting a media component based on an address in a narrative tree. At 652, a processor sets an initial level of a narrative for a sequence of media components. Often this will be the tree's first level but may be a lower level when the narrative has been interrupted and is resuming at a later time. At 654, the processor picks the first or next component in the level, for example, in order of a level sequence identifier or in order of the component identifier. At 656, the processor may determine whether each media component is eligible for play in the current loop, for example by applying a filter as described in connection with column 606 in FIG. 6A. At 660, if the component is eligible for the level, the processor may place its identifier in a memory cache as one of a list (e.g., level-eligible components list). At 658, if all the components in the level have not been considered, the processor at 654 picks the next component for filtering. If all the components in the level have been picked, the processor at 662 may rank the eligible components based on any applicable selection data 672, for example, travel data, user input, biometric response data, or any useful combination of the foregoing. For example, the processor may rank by various criteria, for example, by degree of relation to a travel component; closest predicted adherence to a targeted story arc for emotional responses, closest data distance to a set of user preferences; of a combination of the foregoing factors. In alternative embodiments, the processor may rank the components based on a predictive machine-learning algorithm trained over a training set to achieve a target objective including maximizing one or more of the ranking criteria noted above. At 664, the processor may return a value of the highest ranked media component for use in assembling media content for play in a vehicle during travel. At 666, the processor may determine whether it is finished selecting media components from the narrative tree. If it is not finished, the processor may select the next level at 670, clear the cache of eligible components or start a new list for the next level and continue at 654. If it is finished, the processor may terminate the method 650 at 668.

Figure 7:
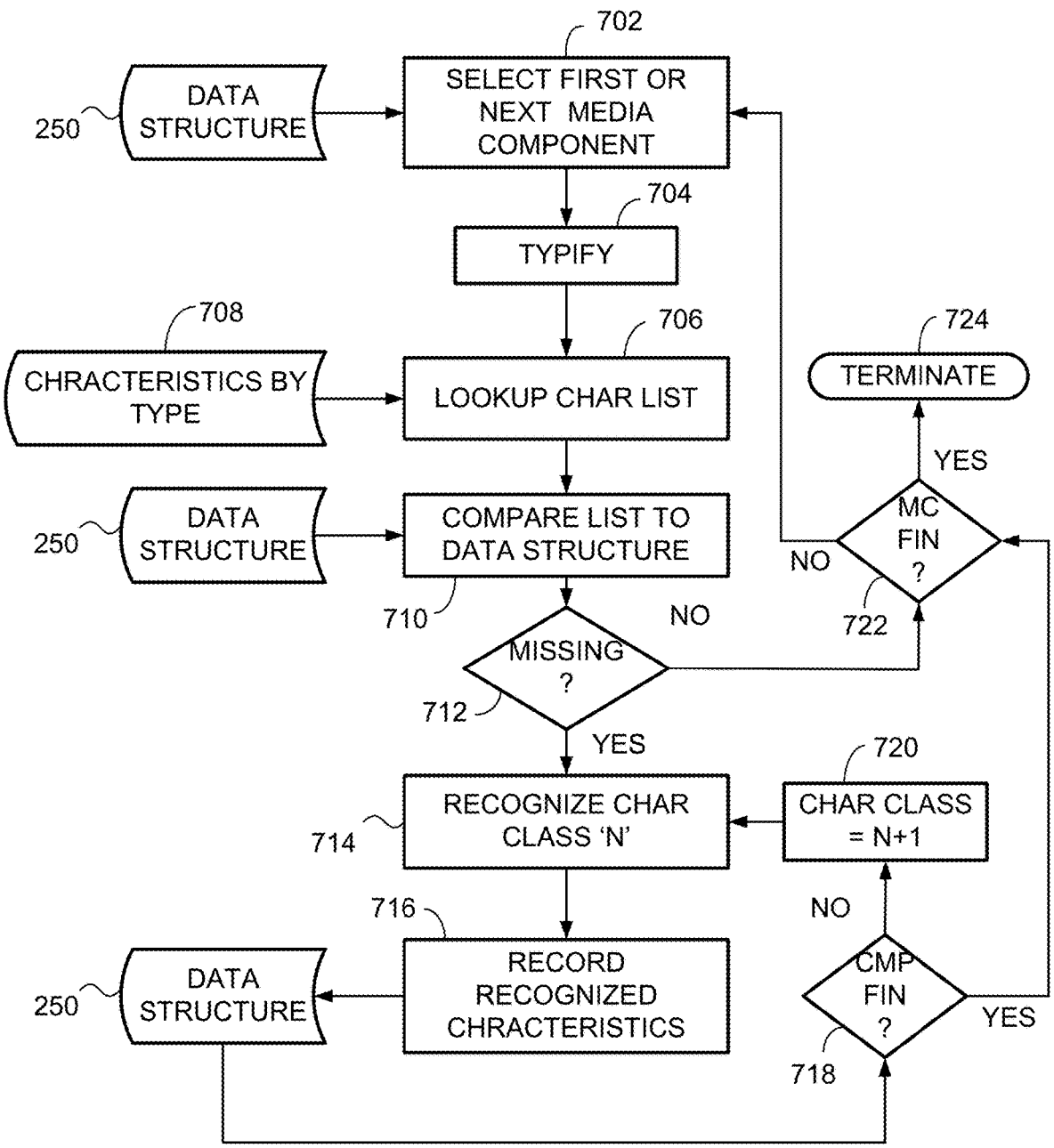
FIG. 7 is a flow chart illustrating aspects of associating by one or more processors a media component with a user-perceivable characteristic.

FIG. 7 shows aspects of an algorithm or method 700 for associating by one or more processors a media component with a user-perceivable characteristic of the component. User-perceivable characteristics may include, for example, tone of a color scheme, mood of a sound track, position in a narrative tree, a duration of a segment, a subject, and identities of one or more characters or objects appearing in or represented by the media component. At 702, the processor may select the media component, for example, using a loop to pick the next or first media component in a list such as the data structure 250 shown in FIG. 2B. An equivalent or different list may also be suitable. An initial list of media may be assembled by a production team. For example, it may be convenient for a production team to create and partially or completely populate a data structure 250 as shown in FIG. 2B or equivalent structure during production of components for media content, as part of a content production process. If a complete data structure is already produced and does not need to be augmented, associating is already completed and there may be no need to execute an automatic process 700. However, some user-perceivable characteristics may not easily be collected or described by the production team. In addition, when converting legacy media content (e.g., digital content converted from film, or older digital content) for use with the methods herein, essentially no user-perceivable characteristics may be available.

At 704-712, the processor may determine whether the component is missing any needed characteristic data. For example, at 704 the processor may determine a type of the media component, for example, video clip, audio clip, 3D model, and so forth, based on metadata or based on a trained machine-learning recognition algorithm for digital data. Then, at 706 the processor may look up a list 708 of desired characteristic classes for the type of media component detected. For example, the list may contain classes of information relevant to travel events such as, for example, a geographic location, historical significance, relation to fictional or historical characters, or play duration; classes of emotional response such as valance, arousal, or content engagement power (CEP); or a class of eligible position or positions in a narrative tree. Then, at 710 the processor may compare the list to the characteristic classes of the media component in the data structure and based on the comparison determine whether the data structure 250 is lacking any desired class of characteristics defined by list 708 for media components of its type. At 712, if the processor determines characterization in a desired class of characteristic is missing, it may execute a process 714 for recognizing characteristics of the missing class. Some user perceivable characteristics may have to be generated, e.g. via a game engine means, to add audio/video/olfactory/haptic accompaniment appropriate to otherwise less engaging content, so the processor may call up or have generated otherwise lacking characteristics. For instance, if a trip route, stop or destination takes the passengers to a famous beachside area, then olfactory ocean aroma delivery means, misting means (as in so-called '4D Theaters) to simulate the environment by the water, and audio of waves crashing on the beach can be added. If at 712 the processor determines that no desired characteristic class is missing, it may proceed to determine at 722 whether characterization of the media content is finished. From block 722, if the process 700 is not complete the processor may proceed to select the next media component in the content at block 702.

The process 714 may receive at least a portion (e.g., a frame of video data) of the media component and/or its metadata as input and output a characteristic in a specified class. The character may be expressed as metadata in the data structure 250, for example, as one of the semantic tags 256. The process 714 may be, or may include, one or more of: a deterministic rules-based algorithm that processes the input using a predetermined ruleset; a machine-learning algorithm trained to recognize a characteristic (e.g., a character, place or object identity) over a set of training data; or a combination of deterministic and machine-learning algorithms. At 716, the processor may record the determined characteristic in the data structure 250. At 718, the processor may determine whether determining characteristics for the media component is finished; if not, if may increment the class by one at 720 and revert to process 714 for the next class. If determination is finished, the processor may determine at 722 whether characterization of the media content is finished. If the determination of the content is complete the processor may terminate the process 700 at 724.

Figure 8:
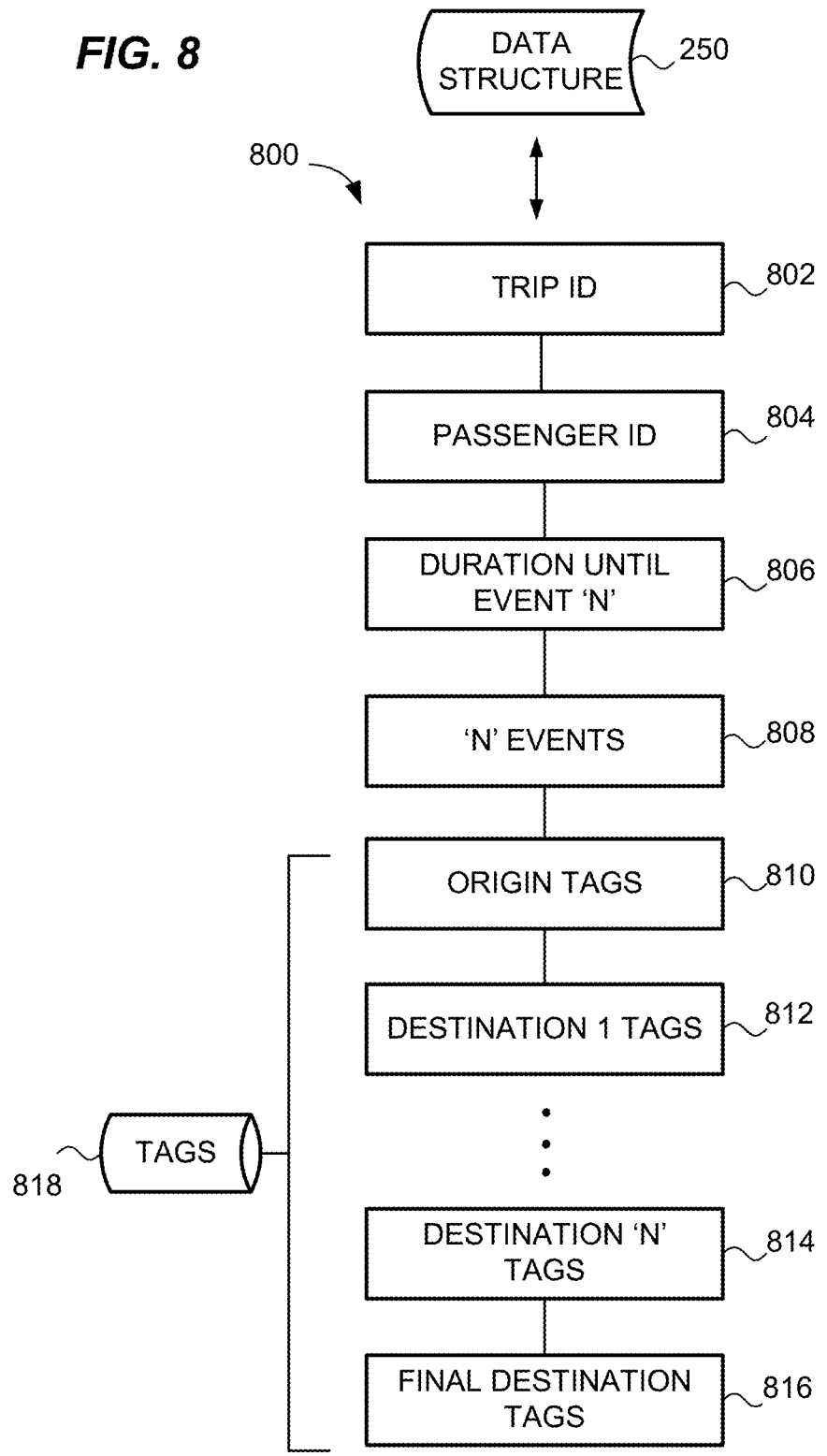
FIG. 8 is a diagram illustrating aspects of a data structure for use by one or more processors for relating a user-perceivable characteristic with a travel event.

FIG. 8 shows an example of a data structure 800 for use by one or more processors for relating a user-perceivable characteristic, for example a location, character or object appearing in or referenced by the media component or a duration of play of the media component with a travel event, for example a change in estimated time remaining until arriving at, or user selection of, a destination, an origin, or a location along the route. Elements of the data structure 800 shown in FIG. 8 may be linked to any media component identifier by a data structure 250 as shown in FIG. 2, or equivalent data structure having elements corresponding to one or more of the elements 802-816. The elements 806-816 are generic with respect to any particular trip or passenger, and so may be used to correlate a media component to multiple trips by multiple passengers. For example, a processor may correlate a media component with a duration of 15 seconds (i.e., a particular duration) and a semantic tag of "Burbank" (i.e., a particular semantic tag) in the data structure 250 to any trip by any passenger along a route that includes at least one destination tag of "Burbank" (i.e., a matching tag) involved in an event (e.g., "proceeding towards") with a duration of 15 seconds or longer. The data structure 800 may be of any suitable type, for example as described in connection with data structure 250 herein above.

The data structure 800 may include elements pertaining to a particular trip and passenger. A processor of a client device or server may set certain elements, for example, the passenger ID 804, an origin name included in the origin tags 810 and a final destination name included in the final destination tags 816, based on a trip request by the passenger (e.g., from a ride hailing application). Other elements may be populated automatically by a server. For example, a remote trip configuration and tracking server may assign a unique trip ID 802 for the dataset 800, select one or more intermediate destination names and locations if any, based on route information from the trip provided by a navigation server.

The trip configuration and tracking server may plan the route based on road and traffic information applicable to routes between the origin and destination, which can change along the route as known in the art. In addition, the trip configuration and tracking server may include affinity, preference, passenger requests and other information in route planning. For example, suppose a passenger traveling from Encino to Burbank has some time to kill and requests "a fun tour of local sights adding not more than 30 extra minutes." Based on his request, the trip configuration and tracking server may pick a non-zero integral number 'N' of locations and add their names and locations to the data structure 800 at elements 812-814. To pick the intermediate destinations, the server may select from a list of places by filtering against expressed or implied preferences of the passenger, subject to the constraints that the added travel time should not be more than an allotted time. For example, if the Encino passenger has an expressed or implied interest in "famous pop musicians," the server may weight a list of local places relevant to famous local musicians based on likely passenger interest using any available information, calculate a set of routes from Encino to Burbank that pass one or more of the weighted places within the requested time limit, and pick the route having the highest weighted passenger interest. In an alternative, or in addition, the server may calculate a most favorable route using a machine-learning algorithm trained over a set of travel and interest data. Once picking the most favorable route, server may populate the relevant elements 812-814. For example of content appropriate to route-location-specific 'famous pop musicians' the generation of a Billy Idol hologram—assuming holographic equipment is provided either embedded or imported into the vehicle—so that the Billy Idol figure either sits next to some passenger(s) or otherwise appears present in the vehicle—as his Encino home is passed, or the visage could be presented augmented reality-style on the lawn of his home as it passed, along with audio of one of his hit songs. Similarly, a VMC may display the hologram along the route to or from a Billy Idol concert.

In addition to name and geographic location of any destination element 810-816, the server may add other semantic tags relating to the destination, for example from a database of tags or other source. Continuing the Encino passenger example, the tags may include the names of the famous pop musicians and descriptions of how the place relates to each name, for example, "birthplace," "home," "studio," and so forth. In a similar manner, the server may assign any tag relevant to both the place and to the passenger preference or affinity data.

The trip event element 808 defines one or more events relevant to each destination element 810-816. The events may include any action that can be determined by the server or a client device to occur at a particular time. The "duration until" element 806 is of special interest to production of media content, which is a forward-looking operation unconcerned with the past. To produce and configure the media content in real time, the server needs to know how much time will pass until the vehicle reaches its final destination or passes an intermediate destination for which the server will select one or more media components. Events may include, for example, "arrive at," "arrive at next," and "wait at," each of which can then be calculated at any point along the travel route. "Wait at" events can have a set duration that does not change during the route. Duration until other events 806 will change during travel and may be updated in the data structure 800 as travel progresses.

Events can apply to specific identified places (e.g., "wait at the library at 5th and Main") or to a changing set of the destinations based on progress of travel. For example, at the beginning of the trip the server may calculate an "arrive at next" for Destination 1 812 and "arrive at" for the remaining destination and add each duration to the data structure. The server may refresh the duration element 806 during travel, periodically and/or in response to events. For example, once the vehicle has departed Destination 1, the server may calculate the "arrive at next" for the next destination (e.g., a Destination 2, not shown) and recalculate the "arrive at" duration for the remaining destinations. In between triggering events such as departures from an intermediate destination, the server may update the "duration until" element periodically, for example, every 5 or 10 seconds. In addition, the server may change add or remove destinations and add or remove semantic tags associated with each destination, as the trip progresses based on passenger input, biometric data, traffic data and any other new available information. Thus, the data structure 800 can be updated and support dynamic configuring, assembling and producing of the media content during travel.

Figure 9:
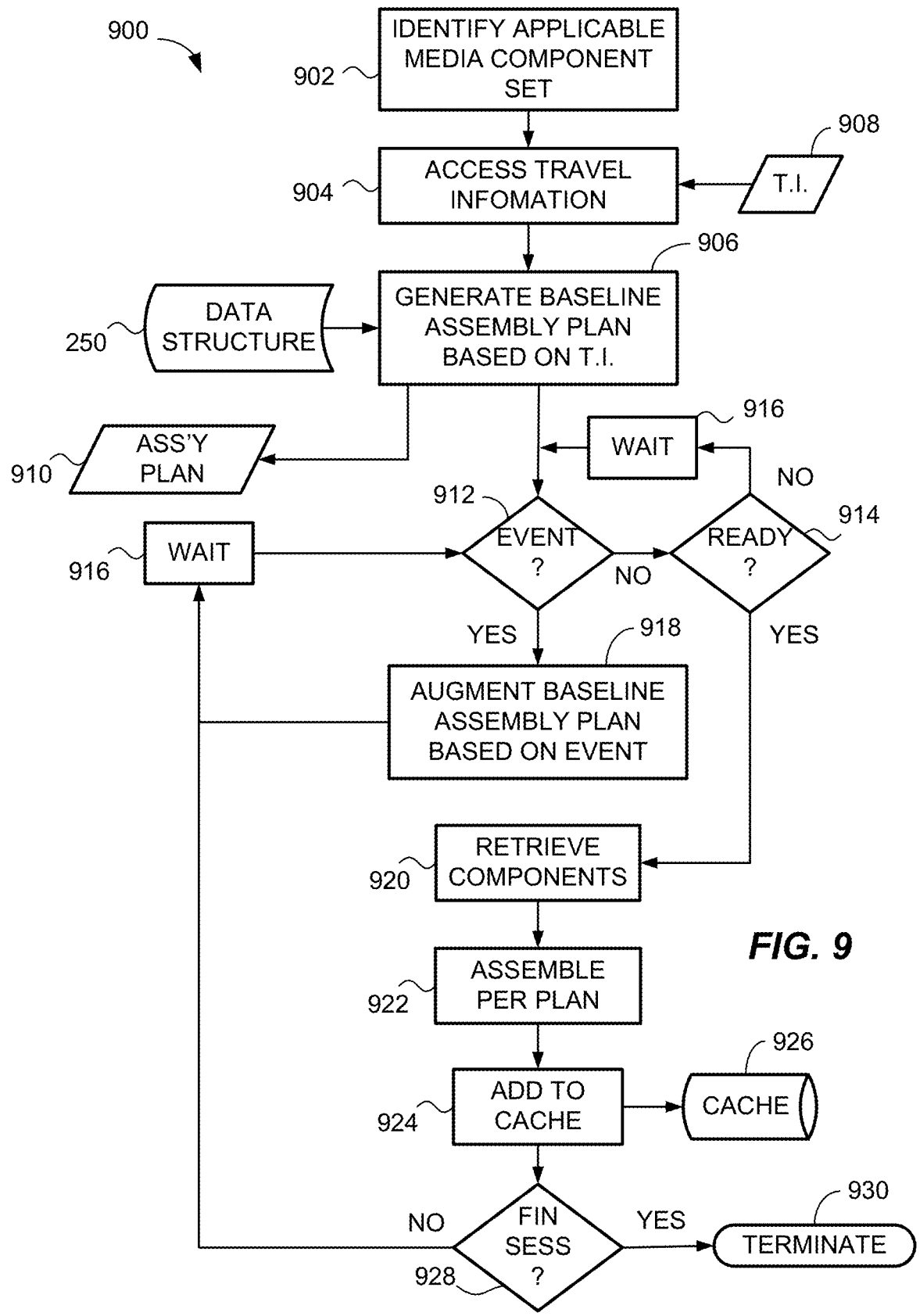
FIG. 9 is a flow chart illustrating aspects of assembling by one or more processors media content from a set of media components based on travel event information.

Based on the information as described in connection with data structures 250 and 800, a server may assemble media content for use during a trip. For example, FIG. 9 shows a method 900 for assembling by one or more processors media content from a set of media components based on travel event information. At 902, the processor may identify an applicable media component set for a passenger and location. For example, based on one or more records (e.g., in a passenger profile) stating the passenger prefers English-language content, lives in Encino, and abhors violent content, the server may filter out identifiers for non-pertinent content components from its library of all available content components. At 904, the server may access travel information 908, for example by identifying a trip ID and passenger ID for locating pertinent travel information in a data structure 800. At 906, the server may generate a baseline (e.g., initial) assembly plan based on the travel information 908, which may be contained in the data structure 800. The server may generate the plan based on the trip origin, destination, a preferred destination, and other criteria as described elsewhere herein. The plan 910 may comprise a sequence of media segments with or without other media components, arranged in a list or other useful data structure.

At 912, the server may determine that a travel event defined in the data structure 800 has occurred, for example by tracking progress of the vehicle along its route. If an event is detected, the server may update the assembly plan 910 based on the event. Although not shown in FIG. 9, the augmentation process 918 may use the most recent copies of the data structures 250, 800 available. For example, if a destination is deleted or changed, the server may remove components picked for a deleted destination, add components picked for the new destination, and adjust components based on changes in estimated durations. At 916, the server may wait for the next event to occur. If at any time or times while waiting 916 the server determines, at 914 that it is ready to assemble and produce the media content for presentation in the vehicle under travel, at 920 it may retrieve the media components for assembly. Then at 922 the server may assemble the components into the media content or portion of the media content, for example by arranging media segments in a sequence and/or rendering a media component to produce a media segment.

At 924, the server may add the assembled components to a cache 926 for deliver to the vehicle under travel. Content in the cache may be streamed or delivered in periodic packages to a media player in the vehicle, and thus, produced for consumption in real time. Once delivered, the server may delete delivered content from the cache 926, immediately after delivery, immediately after the trip is completed, or at some later time. At 928, the server may determine whether the production session is completed, for example in response to termination of the trip or termination of the session by the passenger. Once finished, the server may terminate 930 the session.

Figure 10:
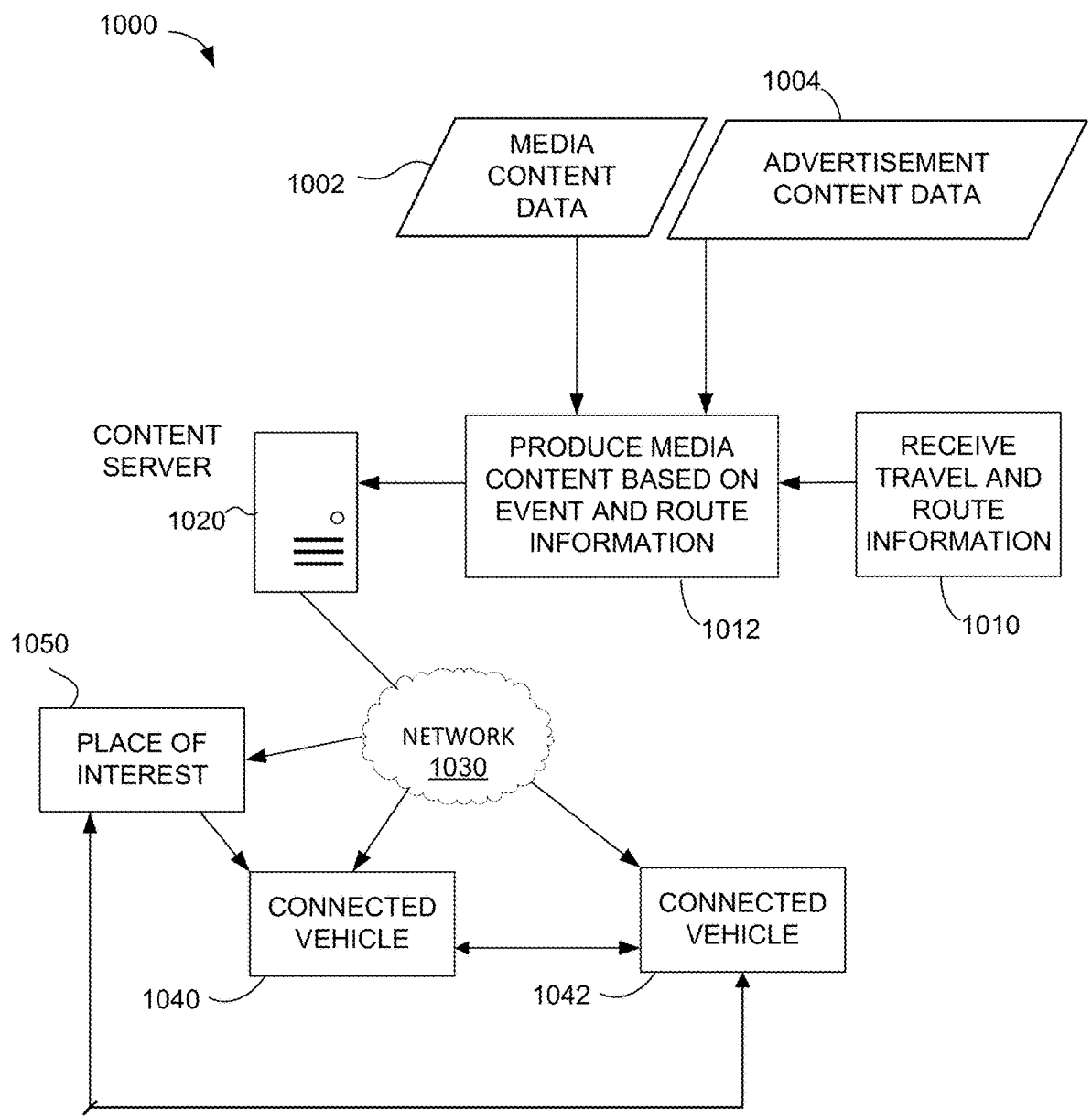
FIG. 10 is a block diagram illustrating an example of a computer network in which the novel methods and apparatus of the application may find use.

FIG. 10 summarizes a computer network 1000 in which the novel methods and apparatus of the application may find use. One or more content servers 1020 (e.g., a server farm or cloud) interconnected through a local area network, wide area network 1030, or other network may execute the processes and algorithms described herein, producing digital media content that may be stored and distributed. In some aspects, narrative content 1002 and advertisement content 1004 may be in analog (e.g., film) and converted to digital form using any suitable conversion process, for example, digital scanning. A production server may produce media content with narrative content 1002 and ad content 1004 based on travel and route information 1010. One or more distribution servers may provide content for processing or delivery to servers at places (or points) of interest 1050 along the route and to connected vehicles 1040-1042, from the content server 1020 through the network 1030, e.g., the Internet or cellular telephone and data networks, and one or more router/modems/hotspots. The connected vehicles 1040-1042 and places of interest 1050 may be connected via a mobile mesh network. Each connected vehicle 1040-1042 may include one or more media players for playing the media content. The media player may include, for example, smartphones, personal computers, notepad devices, projectors, and wearable xR devices. The media content may be transcoded to a suitable format for the player device prior to delivery.

FIG. 11A diagrams a useful automatic process 1100 for producing real-time media content customized for a travel event in a dynamic travel route between an origin and a destination of a connected vehicle. In an aspect of the present disclosure, the process 1100 may be performed by one or more processors at a content server. At 1102, a processor maintains a data structure of media production data in a database. The data may include analog or digital audio-video work, for example entertainment work, instructional, advertisement, gaming, social networking, and so on. The audio-video work may be a defined narrative. The data structure may further include an ordered arrangement of media components for the defined narrative, for example audio video clips or an episode of a series and the like. At 1104, the processor determines associations of the media components with one or more parameters indicating user-perceivable characteristics of a media segment or other media component. For example, the processor may refer to a data structure 250 for example as shown in FIG. 2B and/or structure 800 as shown in FIG. 8 to retrieve a list of semantic tags and duration information.

At 1106, a processor receives information about a travel event, including information about a travel route of the travel event. At 1108, the processor assembles and produces media content by at least one of selecting or configuring the media components from the media database based on travel event information including travel route information. In an aspect, the selected or configured media components may refer to at least one place along the travel route as part of a defined narrative, topical assembly, or video game. The media content may include audio video work of, for example entertainment, instructional information, video gaming, advertisement, and social networking. The media content may also include xR content.

At 1110, a processor provides the media content to one or more connected media players in vehicles on the travel route, for example, by streaming media or by pushing one or more files. In an aspect, a content production server may produce the media content, and a content server may stream the media content. In an aspect, the media production server and the media content server may be co-located or may be combined in one server. In another aspect, a media player device may produce the media content. Other logical and physical arrangements as to where the media content is produced are also possible.

In aspects of the method 1100, the media components may include a set of discrete video clips. In the alternative, the media components may include modeled three-dimensional elements suitable for rendering, and the producing further comprises rendering the modeled three-dimensional elements. In another aspect, the player device may be or may include a mobile communication device, in addition to or instead of vehicle-based media players. In another aspect, the media production data may include dataset addresses in a data structure holding media content data.

At 1112, a media player receives and outputs the media content. Examples of media player include xR output devices (e.g., xR headsets), computers (e.g., mobile), televisions, digital projectors, smartphones, personal digital assistants (PDAs), and other electronic devices both wired and wireless.

FIGS. 11B-11E show additional operations 1120-1188 that may optionally be included in the method 1100 and performed by one or more processors performing the method 1100, in any operative order. Any one or more of the additional operations 1120-1188 may be omitted unless needed by a downstream operation and one or more of the operations 1120-1188 may replace one or more others of the operations of the method 1100. Any useful combination of operations selected from the group consisting of the operations 1102-1188 may be performed by one or more processors of an apparatus as described herein as an independent method distinct from other useful combinations selected from the same group.

Referring to FIG. 11B, the method 1100 may further include at 1122 by one or more processors selecting or configuring media components based on a targeted portion of the trip, for example, a duration, a distance, or geographical location of an origin, destination, or point along a planned route, and a list defining the planned route. The one or more processors may base such selection or configuration on a computation of aggregate durations to complete the defined narrative within the targeted portion of the trip.

In an aspect, the defined narrative is one of a sequence of related narratives, for example, the narrative may be an episode of a series or a scene of an episode. At 1124, the method 1100 may further include by one or more processors, at least one of selecting or configuring at least in part by selecting the defined narrative based on an identity of a last complete one of the sequence of related narratives presented to the passenger. Thus, the passenger may pick up the viewing where last left off.

Passengers may sometimes desire to avoid consuming content that cannot be completed during a trip. Thus, at 1126, the method 1100 may include by one or more processors selecting or configuring the defined narrative at least in part to enable completion within the targeted portion of the trip duration. For example, the processor may cut out a non-essential scene or scenes to enable faster completion or add a non-essential scene or scenes to fill the estimated travel time more perfectly.

Passengers often prefer content that is consistent with their prior consumption habits or other expressed preferences. At 1128, the method 1100 may further include selecting or configuring the media content at least in based on user preference information for one or more passengers in a vehicle. For example, the processor may identify several content options based on travel information and select one of the options based on past preference data for a passenger.

In an aspect, at least one of the selecting or configuring may include use of a predictive algorithm. At 1130, the method 1100 may further include, by one or more processors predicting an affinity of a user of the player device based at least in part on user profile data and the trip event information, using a predictive algorithm, for example, a machine-learning algorithm based on a deep neural network trained on media content relative to affinities of consumers matching the user's profile.

Referring to FIG. 11C, operations 1140 also relate to selection and configuration of media content. At 1142, the method 1100 may further include, by one or more processors selecting or configuring the media components based on at least one place selected from the trip origin, the trip destination, or a place along a route there between, such that the media content refers to the at least one place as part of a defined narrative. For example, in trip through Paris, content may be selected by the processor based on a number or quality of scenes filmed along the planned travel route.

At 1144, the method 1100 may further include, by one or more processors receiving biometric data from the passenger indicating a neurological state, wherein the at least one of selecting or configuring ones of the media components is further based on the biometric data. Further details of selecting or configuring may be as described in International Application PCT/US2018/053625 by inventors hereof, which is incorporated herein in its entirely by reference. Biometric configuration is here combined with selecting or configurating based on travel information.

At 1146, the method 1100 may further include, by one or more processors receiving trip context data regarding the passenger relevant to a purpose of the trip, wherein the at least one of selecting or configuring ones of the media components is directed to furthering a purpose of the trip. For example, if the processor determines that a purpose of the trip is work-related and the business of the passenger is real estate, the processor may select and configure current news regarding notable real estate transactions past and present along the planned route. In an aspect illustrated at 1148, the method 1100 may further include, by one or more processors furthering a purpose of the trip at least in part by selecting one of preparing the passenger for the destination or revisiting an experience at the origin. For example, if the purpose of the trip is a leisurely visit to a theme park, the processor may feature introductions to the attractions of the park on the inbound ride and "behind the scenes" content on the outbound ride. In an aspect 1150 the method 1100 may further include, by one or more processors making use of various characterizations for destinations and origins of trips. For example, the processor may characterize one or both of the destination or origin as one of: a theme park, a conference, an outdoor activity, a sporting event, a musical performance, a dramatic performance, a cinematic experience, a shop or collection of shops, a restaurant or collection of restaurants, a social event, or a holiday celebration. The processor may relate each of these characterizations to characteristics of media components, for example using a process 700 as shown in FIG. 7.

Referring to FIG. 11D, operations 1160 relate to various aspects of the method 1100. At 1162, the method 1100 may further include, by one or more processors receiving personal profile data regarding the passenger and performing at least one of selecting or configuring ones of the media components using an algorithm directed to satisfying at least one of the passenger's interests, preferences, or safety needs. Such an algorithm may include, for example a trained machine learning process or a rules-based algorithms that weights and compares characteristics of passenger profiles to semantic tags in media component metadata.

At 1164, the method 1100 may further include, by one or more processors simulating at least one of a vehicle driver or fellow passenger. For example, as described herein above, the simulating may be for purposes of furthering a narrative or for providing companionship such as a conversational counterpoint for passengers. The simulating may include applying a voice and personality profile to a responsive engine that answers questions posed by passengers, suggests activities at the destination or comments on points of interest along the way, for example. Further details of character simulation may be as described in more detail in International Application PCT/US2017/044038 by inventors hereof, which is incorporated herein in its entirely by reference.

At 1166, the method 1100 may further include, by one or more processors at least one of selecting or configuring further based on user preference information for multiple passengers in a vehicle and the producing further comprises producing different media content for different ones of the passengers based on each passenger's user preference information. In other words, the processor may base selection and configuration criteria on passenger cohorts using some aggregate of the cohort's individual preference information. For example, in a family group the processor may screen content so avoid age-inappropriate content when children are present. In an aspect, the processor may personalize the audio or video provided to different passengers using any suitable unicast technique, e.g., addressing, beaming, etc.

At 1168, the method 1100 may further include, by one or more processors determining whether ones of the media components are qualified for use during the trip based at least in part on one or more of a time of the trip, the origin, the destination and the estimated duration. The processor may use a modified version of the method 650 shown in FIG. 6 to qualify components, wherein trip information replaces narrative tree position as a basis for eligibility, and/or wherein the selection data 672 includes one or more of the time of the trip, the origin, the destination and the estimated duration.

In an aspect, the player device includes a capability for mixed reality output, for example, include an augmented reality goggle or see-through window. At 1170, the method 1100 may further include, by one or more processors, producing or assembling the media content at least in part by selecting or configuring the media components based one or more places along a route between the origin and the destination, such that the media content augments or replaces real scenery with related altered or fantasy scenery. For example, in a tour of New York City, building from Gotham City may replace actual buildings visible from the vehicle.

Referring to FIG. 11E, operations 1180 relate to handling offers presented to passengers as a part of media content. The offers may be included in media components and handled like any other media component. Offers may be triggered by location beacons. In some embodiments, the beacons may be installed or otherwise planted by passengers or systems in vehicles in front of other vehicles to set off events that otherwise would not occur, e.g. in a dynamically changing game such as a mobile scavenger hunt. For example, at 1182, the method 1100 may further include, by one or more processors, receiving travel event information at least in part by receiving a signal from a transmitter based on proximity of the player device to a place of interest along the route, wherein the signal indicates a location of the place of interest. For example, signal may indicate an offer to interact with a person or machine at the place of interest. At 1184, the method 1100 may further include, by one or more processors determining whether to output the offer to a user of the player device. At 1186, the method 1100 may further include, by one or more processors determining whether to output the offer based on one or more of a user profile, a user preference, log-level user data, or trip data. At 1188, the method 1100 may further include, by one or more processors determining whether to output the offer based on a predictive algorithm determining that a likelihood of the user accepting the offer exceeds a threshold.

Figure 12:
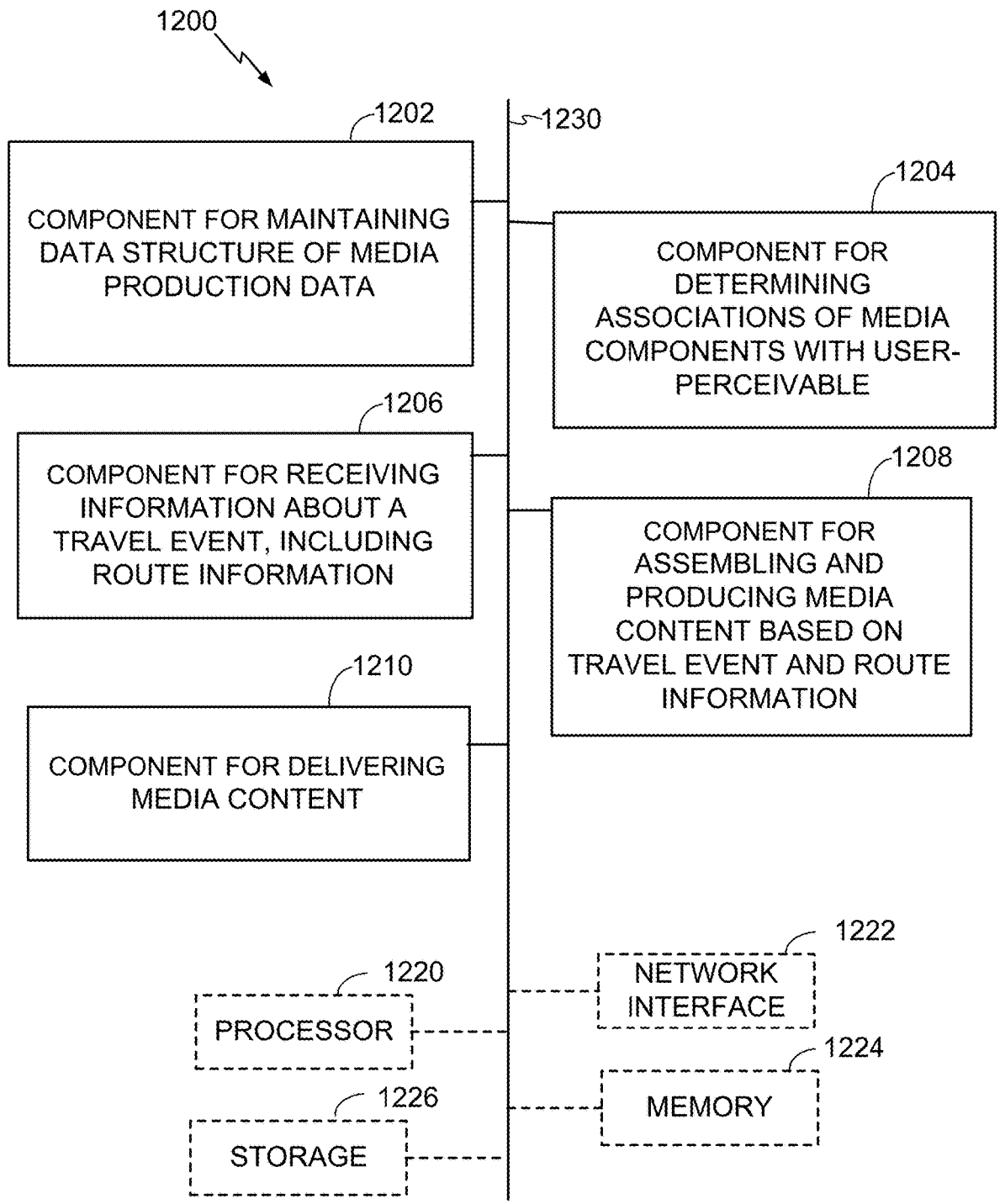
FIG. 12 is a conceptual block diagram illustrating components of an apparatus or system for the method as shown in FIG. 11.

FIG. 12 is a conceptual block diagram illustrating components of an apparatus or system 1200 for producing, in real-time, media content customized for a travel event in a travel route between an origin and a destination of a connected vehicle as described herein, according to one embodiment. As depicted, the apparatus or system 1200 may include functional blocks that can represent functions implemented by a processor, software, or combination thereof (e.g., firmware).

As illustrated in FIG. 12, the apparatus or system 1200 may comprise an electrical component 1202 for maintaining data structure of media production data in a database. The data structure may further include an ordered arrangement of media components for a defined narrative. The component 1202 may be, or may include, a means for said maintaining. Said means may include the processor 1220 coupled to the memory 1224, storage 1226 which may store the database, and to the network interface 1222, the processor executing an algorithm based on program instructions stored in the memory. Such algorithm may include a sequence of more detailed operations, for example, as described in connection with FIGS. 2B and 8 above; more particularly, the operations may include accessing a media component stored in a computer memory; accessing metadata for the media component, accessing a data structure as described in connection with FIG. 2B and optionally FIG. 8, and updating the data structure with new information derived from the media component and/or its metadata. Optionally, the operations may include deriving the new information by processing the media component using a rules-based and/or machine learning algorithm.

The apparatus or system 1200 may further comprise an electrical component 1204 for determining associations of media components with one or more parameters indicating user-perceivable characteristics of a media segment or other media component which is part of the defined narrative. The component 1204 may be, or may include, a means for said determining. Said means may include the processor 1220 coupled to the memory 1224, storage 1226, and to the network interface 1222, the processor executing an algorithm based on program instructions stored in the memory. Such algorithm may include a sequence of more detailed operations, for example, as described in connection with FIGS. 6 and 8 above.

The apparatus or system 1200 may further comprise an electrical component 1206 for receiving information about a travel event, including information about a travel route relative to at least a destination. The component 1206 may be, or may include, a means for said receiving. Said means may include the processor 1220 coupled to the memory 1224, storage 1226, and to the network interface 1222, the processor executing an algorithm based on program instructions stored in the memory. In an aspect, the information may be received from external systems via the network interface 1222. Such algorithm may include a sequence of more detailed operations, for example, establishing a communication session with a client device associated with at least one of a passenger or a vehicle; receiving during the session information from the client device identifying a second client device associated with the other one of a passenger or a vehicle, establishing a second communication session with the second client device, requesting and/or receiving the information about a travel route from one or both of the client device and the second client device; and determining travel event information based at least in part on the travel route and a position of the vehicle.

The apparatus or system 1200 may further comprise an electrical component 1208 for assembling and producing media content by at least one of selecting or configuring the media components from the media database based on travel event and travel route information. The component 1208 may be, or may include, a means for said assembling and producing. Said means may include the processor 1220 coupled to the memory 1224, storage 1226, and to the network interface 1222, the processor executing an algorithm based on program instructions stored in the memory. Such algorithm may include a sequence of more detailed operations, for example, as described in connection with FIG. 9 above.

The apparatus or system 1200 may further comprise an electrical component 1210 for delivering media content for outputting at one or more connected vehicles along the travel route. The component 1208 may be, or may include, a means for said delivering. Said means may include the processor 1220 coupled to the memory 1224, storage 1226, and to the network interface 1222, the processor executing an algorithm based on program instructions stored in the memory. Such algorithm may include a sequence of more detailed operations, for example, establishing a communication session with a media player located in the one or more connected vehicles, and at least one of streaming or pushing the media content to the player device for output in the one or more connected vehicles during travel consistent with the travel information.

As shown, the apparatus or system 1200 may include a processor component 1220 having one or more processors, which may include a digital signal processor. The processor 1220, in such case, may be in operative communication with the modules 1202-1210 via a bus 1230 or other communication coupling, for example, a network. The processor 1220 may initiate and schedule the functions performed by electrical components 1202-1210.

In related aspects, the apparatus or system 1200 may include a network interface module 1222 operable for communicating with any external storage device, with external systems or servers, or connected vehicles over a computer network. In further related aspects, the apparatus or system 1200 may optionally include a module for storing information, such as, for example, a memory device/module 1224. The computer readable medium or the memory module 1224 may be operatively coupled to the other components of the apparatus 1200 via the bus 1230 or the like. The memory module 1224 may be adapted to store computer readable instructions and data for effecting the processes and behavior of the modules 1202-1210, and subcomponents thereof, or the processor 1220, or one or more steps of the method 700. The memory module 1224 may retain instructions for executing functions associated with the modules 1202-1210 and any one or more of the operations described herein, for example in connection with one or more of FIGS. 5, 6B, 7, 9, and 11A-11E. While shown as being external to the memory 1224, it is to be understood that the modules 1202-1210 can exist within the memory 1224.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects are presented as systems or apparatus that may include several components, modules, and the like. It is to be understood and appreciated that the various systems or apparatus may include additional components, modules, etc. and/or may not include all the components, modules, etc. discussed in connection with the Figures. A combination of these approaches may also be used. The various illustrative logical blocks, modules, and circuits described in connection with the aspects disclosed herein may be executed by a general purpose processor, a digital signal processor (DSP), an application specific integrated circuit (ASIC), a field programmable gate array (FPGA) or other programmable logic device, discrete gate or transistor logic, with discrete hardware components in an apparatus or system designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of non-transitory storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, encoded instructions for a method may be embodied in an article of manufacture using standard programming and/or engineering techniques to produce computer-readable media holding software, firmware, hardware, or any combination thereof to control a computer to implement the disclosed aspects. Non-transitory computer readable media for such purpose can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Those skilled in the art will recognize many modifications may be made to this configuration without departing from the scope of the disclosed aspects. Thus, the system methods described herein may be embodied in any computer-readable medium for use by or in connection with an instruction execution system, apparatus, or device, such as a computer-based system, processor-containing system, or other system that fetches the instruction execution system, apparatus or device, and execute the instructions. A computer-readable medium may be any device or apparatus that stores, communicates, propagates, or transports a program for use by or in connection with the instruction execution system, apparatus, or device. For example, non-transitory computer-readable medium may be an electronic, magnetic, optical, electromagnetic, infrared, or semiconductor system, apparatus, device, or other storage medium known in the art or yet to be developed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. For example, process descriptions or blocks in flowcharts and block diagrams presented herein may be understood to represent modules, segments, or portions of code or logic, which include one or more executable instructions for implementing specific logical functions or steps in the associated process. Alternative implementations are included within the scope of the present disclosure in which functions may be executed out of order from the order shown or described herein, including substantially concurrently or in reverse order, depending on the functionality involved, as would be understood by those reasonable skilled in the art after having become familiar with the teachings of the present disclosure. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for configuring media content customized for a travel event, the method comprising:
   maintaining, by one or more processors, a data structure of media production data in an ordered arrangement of media components for the media content;
   determining, by the one or more processors, associations of the media components with one or more parameters indicating user-perceivable characteristics of each of the media components, the determining comprising:
      generating a plurality of user-perceivable characteristics relating to the travel events; and
      mapping one or more of the plurality of user-perceivable characteristics to the media components, wherein the mapping includes a tag that indicates a semantic meaning relevant to one or more travel events;
   receiving, by the one or more processors, travel event information including at least a trip having an origin, a destination and an estimated duration;
   accessing one or more of the media components based at least in part on one or more of the trip destination and the estimated duration;
   producing, by the one or more processors, media content for output by a player device during the trip, the media content comprising the one or more media components; and
   delivering, by the one or more processors, the media content to the player device traveling according to the travel information.

2. The method of claim 1, wherein the accessing is further based on the estimated duration of the trip, to complete a defined narrative within a targeted portion thereof.

3. The method of claim 2, wherein the defined narrative is one of a sequence of related narratives, further comprising selecting the defined narrative based on an identity of a last complete one of the sequence of related narratives presented to a passenger.

4. The method of claim 2, further comprising at least one of selecting or configuring the defined narrative to enable completion within the targeted portion of the trip duration.

5. The method of claim 2, wherein the at least one of selecting or configuring the media components is further based on user preference information for one or more passengers in a vehicle.

6. The method of claim 1, wherein the accessing includes a predictive algorithm.

7. The method of claim 6, wherein the predictive algorithm predicts an affinity of a user of the player device based at least in part on user profile data and the trip event information.

8. The method of claim 6, further comprising receiving biometric data from a passenger indicating a neurological state, wherein the at least one of selecting or configuring one or more of the media components is further based on the biometric data.

9. The method of claim 8, further comprising receiving personal profile data regarding the passenger, wherein the at least one of selecting or configuring one or more of the media components is directed to satisfying at least one of the passenger's interests, preferences, or safety needs.

10. The method of claim 1, wherein the accessing further comprises at least one of selecting or configuring the media components based on at least one place selected from the trip origin, or a place along a route there between, such that the media content refers to the at least one place as part of a defined narrative.

11. The method of claim 1, further comprising receiving trip context data regarding a passenger relevant to a purpose of the trip, wherein the at least one of selecting or configuring one or more of the media components is directed to furthering a purpose of the trip.

12. The method of claim 11, wherein furthering a purpose of the trip is selected from preparing the passenger for the destination or revisiting an experience at the origin.

13. The method of claim 1, wherein the producing the media content further comprises simulating at least one of a vehicle driver or fellow passenger.

14. The method of claim 1, wherein the accessing is further based on user preference information for multiple passengers in a vehicle and the producing further comprises producing different media content for different one or more of the passengers based on each passenger's user preference information.

15. The method of claim 1, wherein the receiving travel event information comprises receiving a signal from a transmitter based on proximity of the player device to a place of interest along the route, wherein the signal indicates a location of the place of interest.

16. The method of claim 15, wherein the signal indicates an offer to interact with a person or machine at the place of interest, and the one or more processors determine whether to output the offer to a user of the player device.

17. The method of claim 16, wherein the one or more processors determine whether to output the offer based on one or more of a user profile, a user preference, log-level user data, trip data, or a predictive algorithm determining that a likelihood of the user accepting the offer exceeds a threshold.

18. The method of claim 1, further comprising determining whether one or more of the media components are qualified for use during the trip based at least in part on one or more of a time of the trip, the origin, the destination and the estimated duration.

19. The method of claim 1, wherein the player device includes mixed reality output, and wherein the producing further comprises at least one of selecting or configuring the media components based one or more places along a route between the origin and the destination, such that the media content augments or replaces real scenery with related altered or fantasy scenery.

20. The method of claim 1, wherein the media components comprise at least one of a set of discrete video clips or modeled three-dimensional elements suitable for rendering wherein the producing further comprises rendering the modeled three-dimensional elements.

21. The method of claim 1, wherein the media production data comprises dataset addresses in a data structure holding media content data.

22. An apparatus for configuring media content customized for a travel event, the apparatus comprising at least one processor coupled to a memory and to a data source for travel information, the memory holding instructions that when executed by the at least one processor, cause the apparatus to perform:

maintaining a data structure of media production data in an ordered arrangement of media components for the media content;

determining associations of the media components with one or more parameters indicating user-perceivable characteristics of each of the media components, the determining comprising:

generating a plurality of user-perceivable characteristics relating to the travel events; and mapping one or more of the plurality of user-perceivable characteristics to the media components, wherein the mapping includes a tag that indicates a semantic meaning relevant to one or more travel events;

receiving travel event information including at least a trip having an origin, a destination and an estimated duration;

accessing one or more of the media components based at least in part on one or more of the trip destination and the estimated duration;

producing media content for output by a player device during the trip, the media content comprising the one or more media components based at least in part on one or more of the trip destination and the estimated duration; and delivering the media content to the player device traveling according to the travel information.

* * * * *